(12) United States Patent
Zhu et al.

(10) Patent No.: US 10,306,666 B2
(45) Date of Patent: May 28, 2019

(54) DATA TRANSMISSION METHOD, BASE STATION, AND USER EQUIPMENT

(71) Applicant: Huawei Technologies Co., Ltd., Shenzhen (CN)

(72) Inventors: Song Zhu, Beijing (CN); Zhiqin Yu, Shenzhen (CN); Zhenyu Li, Beijing (CN); Weiliang Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 123 days.

(21) Appl. No.: 15/363,920

(22) Filed: Nov. 29, 2016

(65) Prior Publication Data
US 2017/0086217 A1 Mar. 23, 2017

Related U.S. Application Data

(63) Continuation of application No. PCT/CN2014/095608, filed on Dec. 30, 2014.

(30) Foreign Application Priority Data

May 29, 2014 (CN) .......................... 2014 1 0233962

(51) Int. Cl.
H04W 72/12 (2009.01)
H04W 8/24 (2009.01)
H04L 1/00 (2006.01)
H04L 5/00 (2006.01)
H04L 27/00 (2006.01)
(Continued)

(52) U.S. Cl.
CPC ....... *H04W 72/1268* (2013.01); *H04L 1/0003* (2013.01); *H04L 1/0009* (2013.01); *H04L 5/0064* (2013.01); *H04L 27/0012* (2013.01); *H04W 8/24* (2013.01);
(Continued)

(58) Field of Classification Search
None
See application file for complete search history.

(56) References Cited

U.S. PATENT DOCUMENTS

2002/0141377 A1 10/2002 Baker et al.
2009/0161613 A1* 6/2009 Kent .................... H04L 1/0016
370/329
(Continued)

FOREIGN PATENT DOCUMENTS

CN 1460340 A 12/2003
CN 1805434 A 7/2006
(Continued)

*Primary Examiner* — Rebecca E Song
(74) *Attorney, Agent, or Firm* — Leydig, Voit & Mayer, Ltd.

(57) ABSTRACT

Embodiments of the present invention disclose a data transmission method, a base station, and user equipment. The method in the embodiments of the present invention includes: receiving, by a base station, a first target sequence and uplink data that are sent by user equipment; determining, by the base station according to a first mapping relationship, a first target uplink sending parameter corresponding to the first target sequence, where the first mapping relationship is used to indicate a correspondence between an uplink sending parameter and a sequence; and demodulating and decoding, by the base station, the uplink data according to the first target uplink sending parameter.

20 Claims, 24 Drawing Sheets

(51) Int. Cl.
*H04W 4/70* (2018.01)
*H04W 84/04* (2009.01)

(52) U.S. Cl.
CPC .......... *H04W 72/1289* (2013.01); *H04W 4/70* (2018.02); *H04W 84/042* (2013.01)

(56) References Cited

U.S. PATENT DOCUMENTS

| | | | | |
|---|---|---|---|---|
| 2010/0103920 | A1* | 4/2010 | Damnjanovic | H04L 1/0026 370/344 |
| 2011/0281605 | A1 | 11/2011 | Shiizaki et al. | |
| 2013/0102341 | A1 | 4/2013 | Alapuranen et al. | |
| 2015/0365181 | A1* | 12/2015 | Nagata | H04L 1/00 370/329 |

FOREIGN PATENT DOCUMENTS

| | | | |
|---|---|---|---|
| CN | 101047971 | A | 10/2007 |
| CN | 101388744 | A | 3/2009 |
| CN | 101945445 | A | 1/2011 |
| CN | 102204152 | A | 9/2011 |

* cited by examiner

DATA TRANSMISSION METHOD, BASE STATION, AND USER EQUIPMENT

CROSS-REFERENCE TO RELATED APPLICATIONS

This application a continuation of International Application No. PCT/CN2014/095608, filed on Dec. 30, 2014, which claims priority to Chinese Patent Application No. 201410233962.1, filed on May 29, 2014. The disclosures of the aforementioned applications are hereby incorporated by reference in their entireties.

TECHNICAL FIELD

The present invention relates to the field of communications technologies, and in particular, to a data transmission method, a base station, and user equipment.

BACKGROUND

M2M (Machine To Machine) refers to a machine to machine wireless data transmission service for serving an industry user by using an industry terminal and multiple transmission modes and based on a wireless network of a mobile network provider. Mobile M2M is applicable to an application scenario in which a mobile peripheral device that has high mobility and needs to communicate with a central node in real time, for example, in an industry such as transportation, public security, customs, taxation, medical care, or logistics. It is obvious that the M2M service is widely applied to a scenario with an extremely small amount of sent data.

In the prior art, in an LTE (Long Term Evolution) system, uplink sending parameters, such as a coding and modulation scheme, which are used by user equipment to send data are all selected by a base station according to channel quality.

However, selection of the uplink sending parameters by the base station cannot be well applied to an M2M service, because a relatively small amount of data is usually sent in the M2M service. If the base station still configures user equipment to send a sounding reference signal to measure channel quality, network overheads are excessively high and efficiency is quite low.

SUMMARY

Embodiments of the present invention provide a data transmission method, a base station, and user equipment, and can effectively reduce overheads in a data transmission process and improve data transmission efficiency.

A first aspect of the embodiments of the present invention provides a data transmission method, including:

receiving, by a base station, a first target sequence and uplink data that are sent by user equipment;

determining, by the base station according to a first mapping relationship, a first target uplink sending parameter corresponding to the first target sequence, where the first mapping relationship is used to indicate a correspondence between an uplink sending parameter and a sequence; and demodulating and decoding, by the base station, the uplink data according to the first target uplink sending parameter.

With reference to the first aspect of the embodiments of the present invention, in a first implementation manner of the first aspect of the embodiments of the present invention, sending, by the base station, the first mapping relationship to the user equipment, so that the user equipment selects an uplink sending parameter according to current channel quality and determines, according to the first mapping relationship, a first target sequence corresponding to the selected uplink sending parameter.

With reference to the first aspect of the embodiments of the present invention or the first implementation manner of the first aspect of the embodiments of the present invention, in a second implementation manner of the first aspect of the embodiments of the present invention, the method further includes:

establishing, by the base station, the first mapping relationship.

With reference to the second implementation manner of the first aspect of the embodiments of the present invention, in a third implementation manner of the first aspect of the embodiments of the present invention, the establishing, by the base station, the first mapping relationship includes:

dividing, by the base station, a channel into multiple sub-channels, where the sub-channels are mutually orthogonal;

separately allocating, by the base station, an uplink sending parameter set to the sub-channels; and establishing, by the base station, the first mapping relationship according to the uplink sending parameter set, where the first mapping relationship is used to indicate a correspondence between a sequence and the uplink sending parameter in the uplink sending parameter set.

With reference to the first aspect of the embodiments of the present invention to the third implementation manner of the first aspect of the embodiments of the present invention, in a fourth implementation manner of the first aspect of the embodiments of the present invention, the receiving, by a base station, a first target sequence and uplink data that are sent by user equipment includes:

receiving, by the base station, the first target sequence and the uplink data that are sent by the user equipment by using a target sub-channel; and the determining, by the base station according to a first mapping relationship, a first target uplink sending parameter corresponding to the first target sequence includes:

determining, by the base station, the target uplink sending parameter set according to the target sub-channel, and determining, from the target uplink sending parameter set according to the first mapping relationship, the first target uplink sending parameter corresponding to the first target sequence.

With reference to the first aspect of the embodiments of the present invention to the fourth implementation manner of the first aspect of the embodiments of the present invention, in a fifth implementation manner of the first aspect of the embodiments of the present invention, the method further includes:

receiving, by the base station, a second target sequence sent by the user equipment, and determining, according to a second mapping relationship, first target channel quality corresponding to the second target sequence, where the second mapping relationship is used to indicate a correspondence between different channel quality and a sequence; and determining, by the base station, a downlink sending parameter according to the first target channel quality, and sending downlink data and the determined downlink sending parameter to the user equipment, so that the user equipment demodulates and decodes, according to the downlink sending parameter, the downlink data sent by the base station.

With reference to the fifth implementation manner of the first aspect of the embodiments of the present invention, in a sixth implementation manner of the first aspect of the embodiments of the present invention, the method further includes:

establishing, by the base station, the second mapping relationship, and sending the second mapping relationship to the user equipment.

A second aspect of the embodiments of the present invention provides a data transmission method, including:

receiving, by a base station, a third target sequence and uplink data that are sent by user equipment;

determining, by the base station according to a third mapping relationship, a second target uplink sending parameter and second target channel quality that are corresponding to the third target sequence, where the third mapping relationship is used to indicate a correspondence between a sequence and each of an uplink sending parameter and channel quality;

demodulating and decoding, by the base station, the uplink data according to the second target uplink sending parameter; and determining, by the base station, a downlink sending parameter according to the second target channel quality, and sending downlink data and the determined downlink sending parameter to the user equipment, so that the user equipment demodulates and decodes, according to the downlink sending parameter, the downlink data sent by the base station.

With reference to the second aspect of the embodiments of the present invention, in a first implementation manner of the second aspect of the embodiments of the present invention, the method further includes:

sending, by the base station, the third mapping relationship to the user equipment, so that the user equipment selects an uplink sending parameter according to current channel quality determined by the user equipment, and determines, according to the third mapping relationship, a third target sequence corresponding to the selected uplink sending parameter.

With reference to the second aspect of the embodiments of the present invention or the first implementation manner of the second aspect of the embodiments of the present invention, in a second implementation manner of the second aspect of the embodiments of the present invention, the method further includes:

establishing, by the base station, the third mapping relationship.

With reference to the second implementation manner of the second aspect of the embodiments of the present invention, in a third implementation manner of the second aspect of the embodiments of the present invention, the establishing, by the base station, the third mapping relationship includes:

dividing, by the base station, a channel into multiple sub-channels, where the sub-channels are mutually orthogonal;

separately allocating, by the base station, an uplink sending parameter set to the sub-channels; and establishing, by the base station, the third mapping relationship according to the uplink sending parameter set, where the third mapping relationship is used to indicate a correspondence between a sequence and each of channel quality and the uplink sending parameter in the uplink sending parameter set.

With reference to the second implementation manner of the second aspect of the embodiments of the present invention and the third implementation manner of the second aspect of the embodiments of the present invention, in a fourth implementation manner of the second aspect of the embodiments of the present invention, the receiving, by a base station, a third target sequence and uplink data that are sent by user equipment includes:

receiving, by the base station, the third target sequence and the uplink data that are sent by the user equipment by using a target sub-channel; and the determining, by the base station according to a third mapping relationship, a second target uplink sending parameter and second target channel quality that are corresponding to the third target sequence includes:

determining, by the base station, the target uplink sending parameter set according to the target sub-channel, and determining, from the target uplink sending parameter set according to the third mapping relationship, the second target uplink sending parameter and the second target channel quality that are corresponding to the third target sequence.

A third aspect of the embodiments of the present invention provides a data transmission method, including:

determining, by user equipment, current channel quality, and selecting an uplink sending parameter according to the current channel quality;

determining, by the user equipment according to a first mapping relationship, a first target sequence corresponding to the selected uplink sending parameter, where the first mapping relationship is used to indicate a correspondence between the uplink sending parameter and a sequence; and sending, by the user equipment, uplink data and the first target sequence to the base station, so that the base station determines, according to the first mapping relationship, a first target uplink sending parameter corresponding to the first target sequence and demodulates and decodes the uplink data according to the first target uplink sending parameter.

With reference to the third aspect of the embodiments of the present invention, in a first implementation manner of the third aspect of the embodiments of the present invention, the method further includes:

receiving, by the user equipment, the first mapping relationship sent by the base station.

With reference to the third aspect of the embodiments of the present invention or the first implementation manner of the third aspect of the embodiments of the present invention, in a second implementation manner of the third aspect of the embodiments of the present invention, the first mapping relationship is used to indicate a correspondence between a sequence and the uplink sending parameter in an uplink sending parameter set, the uplink sending parameter set is separately allocated by the base station to sub-channels, the sub-channels are determined by the base station by dividing a channel, and the sub-channels are mutually orthogonal; and after the determining, by user equipment, current channel quality, and selecting an uplink sending parameter according to the current channel quality, the method further includes:

determining, by the user equipment, a target uplink sending parameter set according to the selected uplink sending parameter, where the selected uplink sending parameter belongs to the target uplink sending parameter set; and determining, by the user equipment, a target sub-channel according to the target uplink sending parameter set, where the target sub-channel is corresponding to the target uplink sending parameter set; and the sending, by the user equipment, uplink data and the first target sequence to the base station further includes:

sending, by the user equipment, the first target sequence and the uplink data to the base station by using the target sub-channel, so that the base station determines the target uplink sending parameter set according to the target sub-channel and determines, from the target uplink sending parameter set according to the first mapping relationship, the first target uplink sending parameter corresponding to the first target sequence.

With reference to the third aspect of the embodiments of the present invention to the second implementation manner of the third aspect of the embodiments of the present invention, in a third implementation manner of the third aspect of the embodiments of the present invention, the method further includes:

receiving, by the user equipment, a second mapping relationship sent by the base station, where the second mapping relationship is used to indicate a correspondence between different channel quality and a sequence;

determining, by the user equipment according to the second mapping relationship, a second target sequence corresponding to the current channel quality;

sending, by the user equipment, the second target sequence to the base station, so that the base station determines, according to the second mapping relationship, first target channel quality corresponding to the second target sequence, determines a downlink sending parameter according to the first target channel quality, and sends downlink data and the determined downlink sending parameter to the user equipment; and demodulating and decoding, by the user equipment, the downlink data according to the downlink sending parameter.

A fourth aspect of the present invention provides a data transmission method, including:

determining, by user equipment, current channel quality, and selecting the uplink sending parameter according to the current channel quality;

determining, by the user equipment according to a third mapping relationship, a third target sequence corresponding to the selected uplink sending parameter, where the third mapping relationship is used to indicate a correspondence between a sequence and each of an uplink sending parameter and channel quality;

sending, by the user equipment, the third target sequence and the uplink data to the base station, so that the base station determines, according to the third mapping relationship, a second target uplink sending parameter and second target channel quality that are corresponding to the third target sequence, and the base station demodulates and decodes the uplink data according to the second target uplink sending parameter, determines a downlink sending parameter according to the second target channel quality, and sends downlink data and the determined downlink sending parameter to the user equipment; and demodulating and decoding, by the user equipment according to the downlink sending parameter, the downlink data sent by the base station.

With reference to the fourth aspect of the embodiments of the present invention, in a first implementation manner of the fourth aspect of the embodiments of the present invention, the method further includes:

receiving, by the user equipment, the third mapping relationship sent by the base station.

With reference to the fourth aspect of the embodiments of the present invention or the first implementation manner of the fourth aspect of the embodiments of the present invention, in a second implementation manner of the fourth aspect of the embodiments of the present invention, the third mapping relationship is used to indicate a correspondence between a sequence and each of channel quality and the uplink sending parameter in an uplink sending parameter set, the uplink sending parameter set is separately allocated by the base station to sub-channels, the sub-channels are determined by the base station by dividing a channel, and the sub-channels are mutually orthogonal;

after the determining, by user equipment, current channel quality, and selecting the uplink sending parameter according to the current channel quality, the method further includes:

determining, by the user equipment, a target uplink sending parameter set according to the selected uplink sending parameter, where the selected uplink sending parameter belongs to the target uplink sending parameter set; and determining, by the user equipment, a target sub-channel according to the target uplink sending parameter set, where the target sub-channel is corresponding to the target uplink sending parameter set; and the sending, by the user equipment, the third target sequence and the uplink data to the base station further includes:

sending, by the user equipment, the third target sequence and the uplink data to the base station by using the target sub-channel, so that the base station determines the target uplink sending parameter set according to the target sub-channel and determines, from the target uplink sending parameter set according to the third mapping relationship, the second target uplink sending parameter and the second target channel quality that are corresponding to the third target sequence.

A fifth aspect of the embodiments of the present invention provides a base station, including:

a first receiving unit, configured to receive a first target sequence and uplink data that are sent by user equipment;

a first determining unit, configured to determine, according to a first mapping relationship, a first target uplink sending parameter corresponding to the first target sequence, where the first mapping relationship is used to indicate a correspondence between an uplink sending parameter and a sequence; and a first processing unit, configured to demodulate and decode the uplink data according to the first target uplink sending parameter.

With reference to the fifth aspect of the embodiments of the present invention, in a first implementation manner of the fifth aspect of the embodiments of the present invention, the base station further includes:

a first sending unit, configured to send the first mapping relationship to the user equipment, so that the user equipment selects an uplink sending parameter according to current channel quality and determines, according to the first mapping relationship, a first target sequence corresponding to the selected uplink sending parameter.

With reference to the fifth aspect of the embodiments of the present invention or the first implementation manner of the fifth aspect of the embodiments of the present invention, in a second implementation manner of the fifth aspect of the embodiments of the present invention, the base station further includes:

a first establishment unit, configured to establish the first mapping relationship.

With reference to the second implementation manner of the fifth aspect of the embodiments of the present invention, in a third implementation manner of the fifth aspect of the embodiments of the present invention, the first establishment unit includes:

a first division module, configured to divide a channel into multiple sub-channels, where the sub-channels are mutually orthogonal;

a first allocation module, configured to separately allocate an uplink sending parameter set to the sub-channels; and a first establishment module, configured to establish the first mapping relationship according to the uplink sending parameter set, where the first mapping relationship is used to indicate a correspondence between a sequence and the uplink sending parameter in the uplink sending parameter set.

With reference to the fifth aspect of the embodiments of the present invention to the third implementation manner of the fifth aspect of the embodiments of the present invention, in a fourth implementation manner of the fifth aspect of the embodiments of the present invention, the first receiving unit is further configured to receive the first target sequence and the uplink data that are sent by the user equipment by using a target sub-channel; and the first determining unit is further configured to: determine the target uplink sending parameter set according to the target sub-channel, and determine, from the target uplink sending parameter set according to the first mapping relationship, the first target uplink sending parameter corresponding to the first target sequence.

With reference to the fifth aspect of the embodiments of the present invention to the fourth implementation manner of the fifth aspect of the embodiments of the present invention, in a fifth implementation manner of the fifth aspect of the embodiments of the present invention, the base station further includes:

a second receiving unit, configured to: receive a second target sequence sent by the user equipment, and determine, according to a second mapping relationship, first target channel quality corresponding to the second target sequence, where the second mapping relationship is used to indicate a correspondence between different channel quality and a sequence; and a second determining unit, configured to: determine a downlink sending parameter according to the first target channel quality, and send downlink data and the determined downlink sending parameter to the user equipment, so that the user equipment demodulates and decodes, according to the downlink sending parameter, the downlink data sent by the base station.

With reference to the fifth implementation manner of the fifth aspect of the embodiments of the present invention, in a sixth implementation manner of the fifth aspect of the embodiments of the present invention, the base station further includes:

a second establishment unit, configured to: establish the second mapping relationship, and send the second mapping relationship to the user equipment.

A sixth aspect of the embodiments of the present invention provides a base station, including:

a third receiving unit, configured to receive a third target sequence and uplink data that are sent by user equipment;

a third determining unit, configured to determine, according to a third mapping relationship, a second target uplink sending parameter and second target channel quality that are corresponding to the third target sequence, where the third mapping relationship is used to indicate a correspondence between a sequence and each of an uplink sending parameter and channel quality;

a second processing unit, configured to demodulate and decode the uplink data according to the second target uplink sending parameter; and a fourth determining unit, configured to: determine a downlink sending parameter according to the second target channel quality, and send downlink data and the determined downlink sending parameter to the user equipment, so that the user equipment demodulates and decodes, according to the downlink sending parameter, the downlink data sent by the base station.

With reference to the sixth aspect of the embodiments of the present invention, in a first implementation manner of the sixth aspect of the embodiments of the present invention, the base station further includes:

a second sending unit, configured to send the third mapping relationship to the user equipment, so that the user equipment selects an uplink sending parameter according to current channel quality determined by the user equipment, and determines, according to the third mapping relationship, a third target sequence corresponding to the selected uplink sending parameter.

With reference to the sixth aspect of the embodiments of the present invention or the first implementation manner of the sixth aspect of the embodiments of the present invention, in a second implementation manner of the sixth aspect of the embodiments of the present invention, the base station further includes:

a third establishment unit, configured to establish the third mapping relationship.

With reference to the second implementation manner of the sixth aspect of the embodiments of the present invention, in a third implementation manner of the sixth aspect of the embodiments of the present invention, the third establishment unit includes:

a second division module, configured to divide a channel into multiple sub-channels, where the sub-channels are mutually orthogonal;

a second allocation module, configured to separately allocate an uplink sending parameter set to the sub-channels; and a second establishment module, configured to establish the third mapping relationship according to the uplink sending parameter set, where the third mapping relationship is used to indicate a correspondence between a sequence and each of channel quality and the uplink sending parameter in the uplink sending parameter set.

With reference to the sixth aspect of the embodiments of the present invention to the third implementation manner of the sixth aspect of the embodiments of the present invention, in a fourth implementation manner of the sixth aspect of the embodiments of the present invention, the third receiving unit is further configured to receive the third target sequence and the uplink data that are sent by the user equipment by using a target sub-channel; and the third determining unit is further configured to: determine the target uplink sending parameter set according to the target sub-channel, and determine, from the target uplink sending parameter set according to the third mapping relationship, the second target uplink sending parameter and the second target channel quality that are corresponding to the third target sequence.

A seventh aspect of the embodiments of the present invention provides user equipment, including:

a fifth determining unit, configured to: determine current channel quality, and select an uplink sending parameter according to the current channel quality;

a sixth determining unit, configured to determine, according to a first mapping relationship, a first target sequence corresponding to the selected uplink sending parameter, where the first mapping relationship is used to indicate a correspondence between the uplink sending parameter and a sequence; and a third sending unit, configured to send uplink data and the first target sequence to the base station, so that the base station determines, according to the first mapping relationship, a first target uplink sending parameter corresponding to the first target sequence and demodulates and decodes the uplink data according to the first target uplink sending parameter.

With reference to the seventh aspect of the embodiments of the present invention, in a first implementation manner of the seventh aspect of the embodiments of the present invention, the user equipment further includes:

a fourth receiving unit, configured to receive the first mapping relationship sent by the base station.

With reference to the seventh aspect of the embodiments of the present invention or the first implementation manner of the seventh aspect of the embodiments of the present invention, in a second implementation manner of the seventh aspect of the embodiments of the present invention, the fifth determining unit includes:

a first determining module, configured to determine a target uplink sending parameter set according to the selected uplink sending parameter, where the selected uplink sending parameter belongs to the target uplink sending parameter set, the first mapping relationship is used to indicate a correspondence between a sequence and the uplink sending parameter in an uplink sending parameter set, the uplink sending parameter set is separately allocated by the base station to sub-channels, the sub-channels are determined by the base station by dividing a channel, and the sub-channels are mutually orthogonal; and a second determining module, configured to determine a target sub-channel according to the target uplink sending parameter set, where the target sub-channel is corresponding to the target uplink sending parameter set; where the third sending unit is further configured to send the first target sequence and the uplink data to the base station by using the target sub-channel, so that the base station determines the target uplink sending parameter set according to the target sub-channel and determines, from the target uplink sending parameter set according to the first mapping relationship, the first target uplink sending parameter corresponding to the first target sequence.

With reference to the seventh aspect of the embodiments of the present invention to the second implementation manner of the seventh aspect of the embodiments of the present invention, in a third implementation manner of the seventh aspect of the embodiments of the present invention, the user equipment further includes:

a fourth receiving unit, configured to receive a second mapping relationship sent by the base station, where the second mapping relationship is used to indicate a correspondence between different channel quality and a sequence;

a seventh determining unit, configured to determine, according to the second mapping relationship, a second target sequence corresponding to the current channel quality;

a fourth sending unit, configured to send the second target sequence to the base station, so that the base station determines, according to the second mapping relationship, first target channel quality corresponding to the second target sequence, determines a downlink sending parameter according to the first target channel quality, and sends downlink data and the determined downlink sending parameter to the user equipment; and a third processing unit, configured to demodulate and decode the downlink data according to the downlink sending parameter.

An eighth aspect of the embodiments of the present invention provides user equipment, including:

an eighth determining unit, configured to: determine current channel quality, and select the uplink sending parameter according to the current channel quality;

a ninth determining unit, configured to determine, according to a third mapping relationship, a third target sequence corresponding to the selected uplink sending parameter, where the third mapping relationship is used to indicate a correspondence between a sequence and each of an uplink sending parameter and channel quality;

a fifth sending unit, configured to send the third target sequence and the uplink data to the base station, so that the base station determines, according to the third mapping relationship, a second target uplink sending parameter and second target channel quality that are corresponding to the third target sequence, and the base station demodulates and decodes the uplink data according to the second target uplink sending parameter, determines a downlink sending parameter according to the second target channel quality, and sends downlink data and the determined downlink sending parameter to the user equipment; and a fourth processing unit, configured to demodulate and decode, according to the downlink sending parameter, the downlink data sent by the base station.

With reference to the eighth aspect of the embodiments of the present invention, in a first implementation manner of the eighth aspect of the embodiments of the present invention, the user equipment further includes:

a fifth receiving unit, configured to receive the third mapping relationship sent by the base station.

With reference to the eighth aspect of the embodiments of the present invention or the first implementation manner of the eighth aspect of the embodiments of the present invention, in a second implementation manner of the eighth aspect of the embodiments of the present invention, the eighth determining unit includes:

a third determining module, configured to determine a target uplink sending parameter set according to the selected uplink sending parameter, where the selected uplink sending parameter belongs to the target uplink sending parameter set, the third mapping relationship is used to indicate a correspondence between a sequence and each of channel quality and the uplink sending parameter in an uplink sending parameter set, the uplink sending parameter set is separately allocated by the base station to sub-channels, the sub-channels are determined by the base station by dividing a channel, and the sub-channels are mutually orthogonal; and a fourth determining module, configured to determine a target sub-channel according to the target uplink sending parameter set, where the target sub-channel is corresponding to the target uplink sending parameter set; where the fifth sending unit is further configured to send the third target sequence and the uplink data to the base station by using the target sub-channel, so that the base station determines the target uplink sending parameter set according to the target sub-channel and determines, from the target uplink sending parameter set according to the third mapping relationship, the second target uplink sending parameter and the second target channel quality that are corresponding to the third target sequence.

The embodiments of the present invention provide a data transmission method, a base station, and user equipment. The data transmission method is: A base station receives a first target sequence and uplink data that are sent by user equipment; the base station determines, according to a first mapping relationship, a first target uplink sending parameter corresponding to the first target sequence, where the first mapping relationship is used to indicate a correspondence between an uplink sending parameter and a sequence; and the base station demodulates and decodes the uplink data according to the first target uplink sending parameter. According to the embodiments of the present invention, a base station only needs to receive a first target sequence determined by user equipment, without measuring current channel quality, to determine, according to a first mapping relationship, an uplink sending parameter corresponding to the first target sequence, so that channel estimation can be performed, and uplink data can be demodulated and decoded. In this way, network overheads in a data transmission process are reduced, and data transmission efficiency is effectively improved.

DESCRIPTION OF EMBODIMENTS

Figure 1:
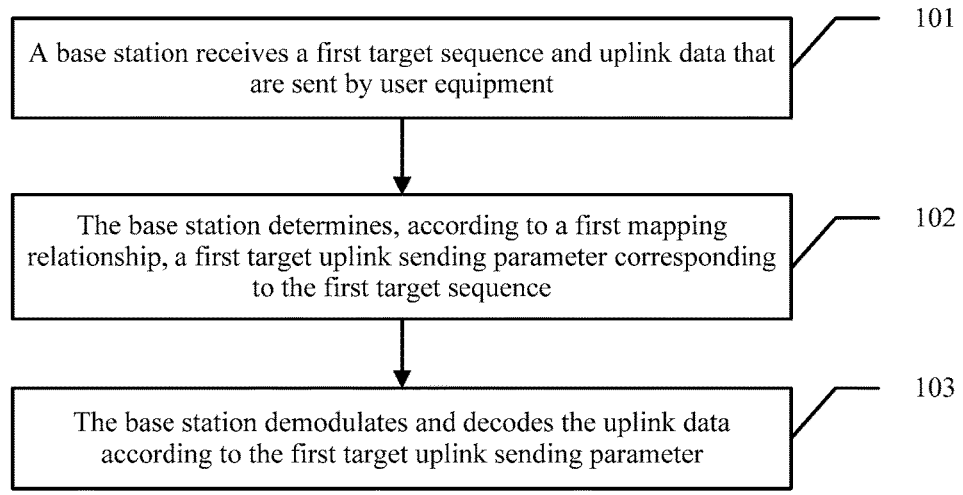
FIG. 1 is a step flowchart of an embodiment of a data transmission method according to the embodiments of the present invention.

An embodiment of the present invention provides a data transmission method. Details are shown in FIG. 1.

101. A base station receives a first target sequence and uplink data that are sent by user equipment.

The first target sequence is determined by the user equipment, and a specific manner of determining the first target sequence is as follows: The user equipment selects an uplink sending parameter according to current channel quality and determines, according to a first mapping relationship, a first target sequence corresponding to the selected uplink sending parameter.

Specifically, the current channel quality includes a signal to interference plus noise ratio, a bit error rate, or a symbol error rate. The uplink sending parameter is a parameter related to uplink data sending, that is, the uplink sending parameter includes but is not limited to an uplink data decoding scheme, a modulation scheme, uplink data transmit power, and a quantity of repetition times.

More specifically, the first mapping relationship is used to indicate a correspondence between different uplink sending parameters and different sequences.

The base station may receive the first target sequence and the uplink data together, or may sequentially receive the first target sequence and the uplink data.

102. The base station determines, according to a first mapping relationship, a first target uplink sending parameter corresponding to the first target sequence.

After determining that the first target sequence and the uplink data are received, the base station determines, according to the first mapping relationship, the first target uplink sending parameter corresponding to the first target sequence.

That is, the base station determines, according to the first mapping relationship, that an uplink sending parameter corresponding to the first target sequence is the first target uplink sending parameter.

103. The base station demodulates and decodes the uplink data according to the first target uplink sending parameter.

The base station may perform, according to the first target uplink sending parameter, channel estimation on an uplink channel used to send the uplink data, thereby improving decoding performance of the base station.

The base station may demodulate and decode, by using the first target uplink sending parameter, the uplink data sent by the user equipment.

In this embodiment, the base station receives the first target sequence and the uplink data that are sent by the user equipment, and determines, according to the first mapping relationship, the first target uplink sending parameter corresponding to the first target sequence, so as to demodulate and decode the uplink data. In this embodiment, the user equipment determines the first target uplink sending parameter and notifies the base station of the first target uplink sending parameter in a form of a sequence. Therefore, in a process of sending the uplink data, overheads are low and efficiency is high, preventing a disadvantage of excessively high network overheads and low efficiency caused because the base station configures and sends a sounding reference signal to measure channel quality.

Figure 2:
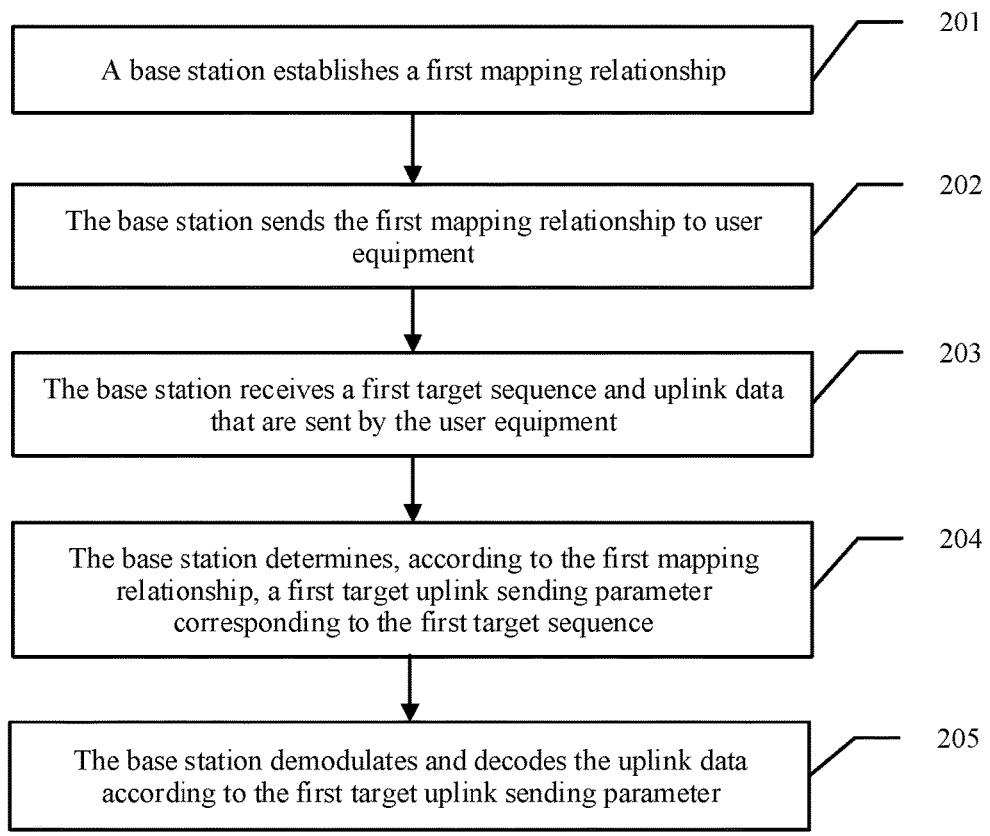
FIG. 2 is a step flowchart of another embodiment of a data transmission method according to the embodiments of the present invention.

FIG. 1 describes the data transmission method in detail. With reference to FIG. 2, the following describes in detail how the base station generates the first mapping relationship.

201. The base station establishes the first mapping relationship.

The base station pre-establishes the first mapping relationship. The first mapping relationship is used to indicate a correspondence between different uplink sending parameters and different sequences.

Specifically, the base station pre-allocates a sequence to each uplink sending parameter that is used by the user equipment to send uplink sent data, where the uplink sending parameter is a parameter related to uplink data sending.

That is, the user equipment uses different uplink sending parameters according to different channel quality, to send the uplink data.

202. The base station sends the first mapping relationship to the user equipment.

The base station sends the established first mapping relationship to the user equipment, so that the user equipment selects an uplink sending parameter according to current channel quality and determines, according to the first mapping relationship, a first target sequence corresponding to the selected uplink sending parameter.

The base station may send the first mapping relationship to the user equipment by means of system broadcast, or send the first mapping relationship to the user equipment by using a downlink control channel.

203. The base station receives a first target sequence and uplink data that are sent by the user equipment.

204. The base station determines, according to the first mapping relationship, a first target uplink sending parameter corresponding to the first target sequence.

205. The base station demodulates and decodes the uplink data according to the first target uplink sending parameter.

Processes of step 203 to step 205 in this embodiment are the same as processes of step 101 to step 103 shown in FIG. 1. Details are not described in this embodiment.

In this embodiment, the base station establishes the first mapping relationship, and then, after receiving the first target sequence sent by the user equipment, the base station may determine, according to the first mapping relationship established by the base station, the first target uplink sending parameter corresponding to the first target sequence, and then demodulates and decodes the uplink data according to the first target uplink sending parameter. Therefore, the base station may determine the uplink sending parameter according to the first mapping relationship, without sending a sounding reference signal to measure channel quality, which reduces network overheads and improves efficiency.

Figure 3:
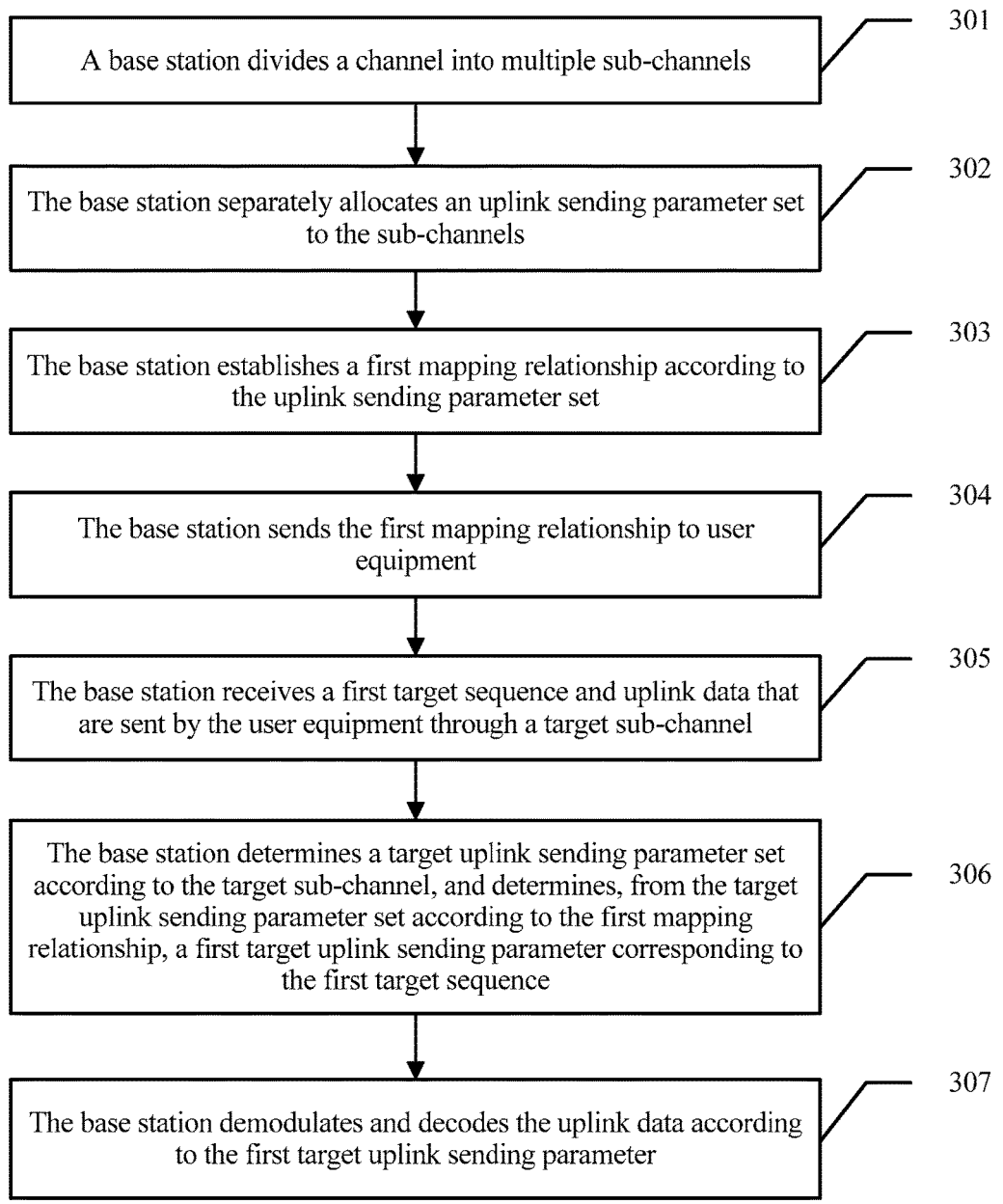
FIG. 3 is a step flowchart of another embodiment of a data transmission method according to the embodiments of the present invention.

The embodiment shown in FIG. 2 describes in detail how the base station generates the first mapping relationship. With reference to an embodiment shown in FIG. 3, the following describes how to reduce decoding complexity of the base station.

301. The base station divides a channel into multiple sub-channels.

The base station divides the channel into the multiple sub-channels, where the sub-channels are mutually orthogonal.

302. The base station separately allocates an uplink sending parameter set to the sub-channels.

The uplink sending parameter set includes an uplink sending parameter that may be used by the user equipment when the user equipment sends uplink data.

The uplink sending parameter set may include one or more uplink sending parameters, or the sending parameter set may be empty.

303. The base station establishes the first mapping relationship according to the uplink sending parameter set.

After determining uplink sending parameter sets, the base station separately establishes first mapping relationships in the uplink sending parameter sets.

The first mapping relationship is used to indicate a correspondence between a sequence and the uplink sending parameter in the uplink sending parameter set.

In this embodiment, first mapping relationships are separately established in uplink sending parameter sets corresponding to sub-channels. Therefore, on different sub-channels, a same sequence may be used to correspond to an uplink sending parameter.

That is, sequences on different sub-channels may be reused, and there are fewer uplink sending manners in the uplink sending parameter sets corresponding to the sub-channels, which effectively reduces a quantity of sequences.

304. The base station sends the first mapping relationship to the user equipment.

The first mapping relationships established by the base station belong to the uplink sending parameter sets allocated by the base station to the sub-channels. Therefore, the first mapping relationships are respectively corresponding to the sub-channels.

The base station separately sends the first mapping relationships to the user equipment by using the sub-channels corresponding to the first mapping relationships, or may send the first mapping relationship and a correspondence between the first mapping relationship and a sub-channel to the user equipment by means of system broadcast.

305. The base station receives the first target sequence and the uplink data that are sent by the user equipment by using a target sub-channel.

After the base station sends the first mapping relationship to the user equipment, the user equipment selects an uplink sending parameter according to determined current channel quality, determines, according to the selected uplink sending parameter, a target uplink sending parameter set to which the uplink sending parameter belongs, and determines a sub-channel corresponding to the target uplink sending parameter set, and the user equipment determines, according to the first mapping relationship, a first target sequence corresponding to the selected uplink sending parameter.

306. The base station determines the target uplink sending parameter set according to the target sub-channel, and determines, from the target uplink sending parameter set according to the first mapping relationship, a first target uplink sending parameter corresponding to the first target sequence.

The base station determines the target sub-channel that is used to receive the uplink data and the first target sequence that are sent by the user equipment.

The base station determines the target uplink sending parameter set corresponding to the target sub-channel, and determines the first mapping relationship that is pre-established in the target uplink sending parameter set.

The base station determines, according to the first mapping relationship, the first target uplink sending parameter corresponding to the first target sequence.

307. The base station demodulates and decodes the uplink data according to the first target uplink sending parameter.

The base station may demodulate and decode, by using the first target uplink sending parameter, the uplink data sent by the user equipment. In addition, because a quantity of sequences is apparently reduced in this embodiment, decoding complexity of the base station is effectively reduced, and data transmission efficiency is improved.

In this embodiment, the base station divides the channel into the multiple sub-channels, separately allocates the uplink sending parameter set to the sub-channels, and establishes the first mapping relationships in the uplink sending parameter sets. The first mapping relationship includes the correspondence between a sequence and the uplink sending parameter in the uplink sending parameter set. According to this embodiment, sequences on different sub-channels may be reused, and therefore, a quantity of sequences is reduced, which effectively reduces decoding complexity of the base station, improves decoding precision of the base station, and improves data transmission efficiency.

Figure 4:
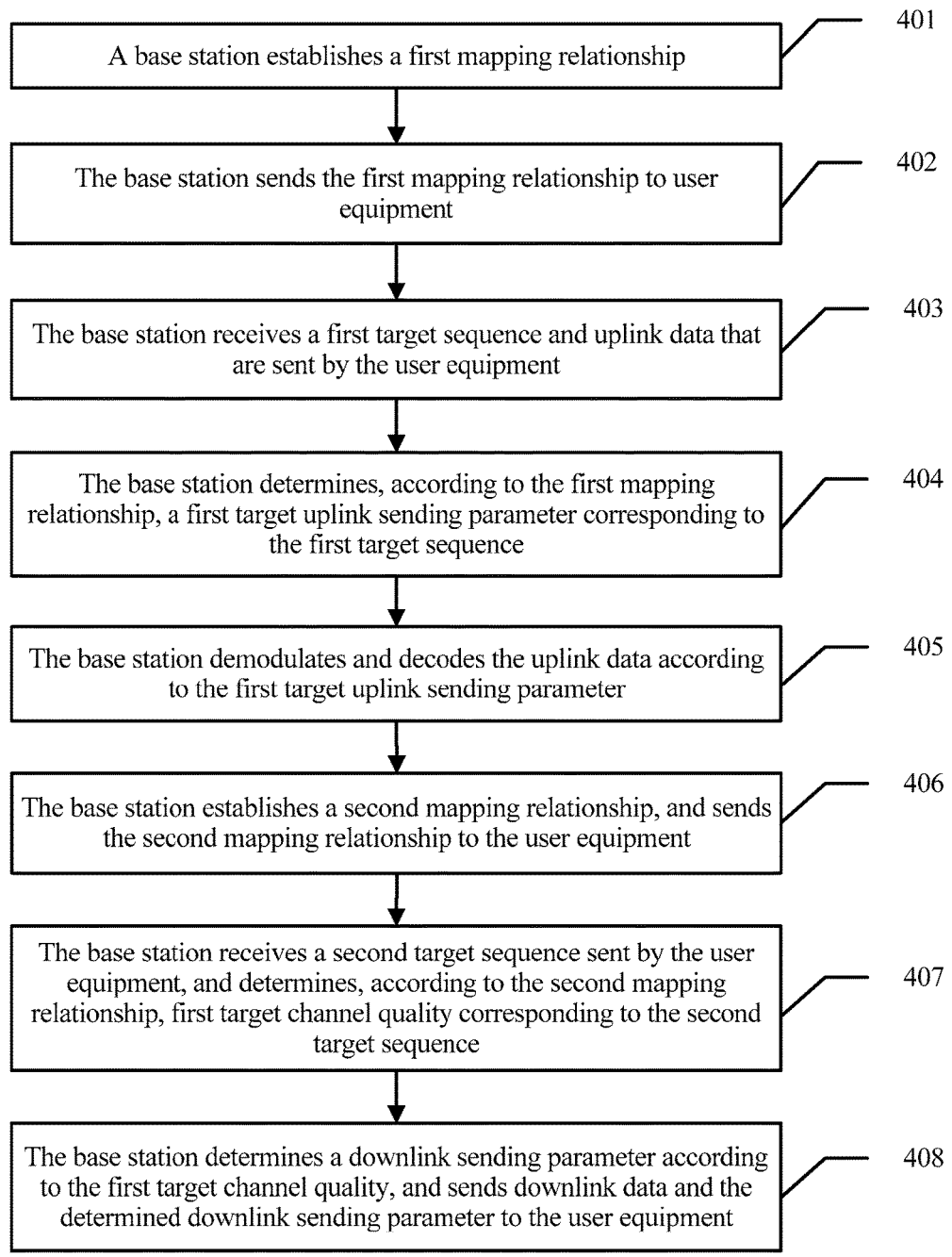
FIG. 4 is a step flowchart of another embodiment of a data transmission method according to the embodiments of the present invention.

The embodiment shown in FIG. 2 describes in detail how the base station generates the first mapping relationship. With reference to an embodiment shown in FIG. 4, the following describes how the base station changes an uplink data sending manner.

401. The base station establishes the first mapping relationship.

402. The base station sends the first mapping relationship to the user equipment.

403. The base station receives a first target sequence and uplink data that are sent by the user equipment.

404. The base station determines, according to the first mapping relationship, a first target uplink sending parameter corresponding to the first target sequence.

405. The base station demodulates and decodes the uplink data according to the first target uplink sending parameter.

Specific processes of step 401 to step 405 in this embodiment are the same as processes of step 201 to step 205 shown in FIG. 2. Details are not described in this embodiment.

Further, according to step 401 to step 405 in this embodiment, the user equipment successfully sends the uplink data to the base station, and the base station also obtains the reliable first target uplink sending parameter according to the first target sequence sent by the user equipment. If the user equipment further needs to send uplink data, to improve sending efficiency of the uplink data and reduce a delay, the user equipment does not need to further send a sequence that is used for distinguishing between different uplink sending parameters, but continues to send the uplink data by using a determined uplink channel, until sending of the uplink data is completed. The base station notifies, specifically in the following manner, the user equipment that the uplink data sending manner is changed.

406. The base station establishes the second mapping relationship, and sends the second mapping relationship to the user equipment.

After the base station obtains the reliable first target uplink sending parameter and the user equipment does not need to further send the first target sequence, the base station establishes the second mapping relationship.

A specific manner of determining, by the base station, that the user equipment does not need to further send the first target sequence may be that, the uplink data received by the base station carries indication information that is used to indicate a size of uplink data, and the base station may determine the size of the uplink data according to the indication information. If the base station determines, by using the indication information, that sending of the uplink data that needs to be sent by the user equipment cannot be completed at a time, the base station establishes the second mapping relationship, where the second mapping relationship is used to indicate a correspondence between different channel quality and a sequence.

The base station needs to generate downlink data that is used to notify the user equipment that the user equipment does not need to further send the first target sequence.

To determine the downlink data, the base station needs to determine downlink channel quality. Then the base station sends the downlink data by using a determined downlink channel to notify the user equipment that the user equipment does not need to further send the first target sequence.

The base station sends the established second mapping relationship to the user equipment by means of system broadcast or by using a downlink control channel, so that the user equipment determines, according to the second mapping relationship, a second target sequence corresponding to the current channel quality.

407. The base station receives the second target sequence sent by the user equipment, and determines, according to the second mapping relationship, first target channel quality corresponding to the second target sequence.

The second mapping relationship includes the correspondence between different channel quality and a sequence. Therefore, the base station may determine the first target channel quality according to the second target sequence received by the base station.

408. The base station determines a downlink sending parameter according to the first target channel quality, and sends downlink data and the determined downlink sending parameter to the user equipment.

The base station determines the downlink sending parameter according to the determined first target channel quality, where the downlink sending parameter is a parameter related to downlink data sending.

Specifically, the downlink sending parameter includes but is not limited to a downlink data decoding scheme, a modulation scheme, downlink data transmit power, and a quantity of repetition times.

The base station sends the downlink sending parameter and the downlink data to the user equipment. The downlink sending parameter and the downlink data may be sent to the user equipment together or may be sequentially sent to the user equipment. In this case, the user equipment demodulates and decodes, according to the downlink sending parameter, the downlink data sent by the base station.

The base station may add notification information to the downlink data to notify the user equipment that when subsequently sending uplink data, the user equipment does not need to re-determine a sequence, but sends the uplink data by using the first target uplink sending parameter, until sending of the uplink data is completed.

In this embodiment, the base station may establish the second mapping relationship that is used to indicate the correspondence between different channel quality and a sequence, and receives the second target sequence sent by the user equipment. The base station may determine the first target channel quality according to the second target sequence received by the base station. The base station determines the downlink sending parameter according to the first target channel quality, and sends the determined downlink sending parameter and the downlink data to the user equipment. Therefore, the base station only needs to receive the second target sequence sent by the user equipment, without detecting channel quality, to determine the first target channel quality. In addition, when a size of the uplink data is relatively large, the base station may notify the user equipment that the user equipment does not need to further send the first target sequence, which improves data transmission efficiency.

The embodiments shown in FIG. 1 to FIG. 4 describe the data transmission method in detail. With reference to an embodiment shown in FIG. 5, the following describes how to further improve data transmission efficiency.

501. A base station receives a third target sequence and uplink data that are sent by user equipment.

That is, in a specific data transmission process, the user equipment selects an uplink sending parameter according to current channel quality determined by the user equipment, and determines, according to a third mapping relationship, a third target sequence corresponding to the selected uplink sending parameter.

The third mapping relationship is used to indicate a correspondence between a sequence and each of an uplink sending parameter and channel quality.

Specifically, different uplink sending parameters are corresponding to different channel quality. The third mapping relationship includes a correspondence between a sequence and an uplink sending parameter and a correspondence between the sequence and channel quality.

That is, an uplink sending parameter and current channel quality that are corresponding to the sequence may be determined by using the third mapping relationship.

The base station may receive the third target sequence and the uplink data together, or may sequentially receive the third target sequence and the uplink data.

502. The base station determines, according to a third mapping relationship, a second target uplink sending parameter and second target channel quality that are corresponding to the third target sequence.

After determining that the third target sequence and the uplink data are received, according to the third mapping relationship, the base station determines the second target uplink sending parameter corresponding to the third target sequence and determines the second target channel quality corresponding to the third target sequence.

503. The base station demodulates and decodes the uplink data according to the second target uplink sending parameter.

The base station demodulates and decodes the uplink data according to the second target uplink sending parameter determined by the base station.

504. The base station determines a downlink sending parameter according to the second target channel quality, and sends downlink data and the determined downlink sending parameter to the user equipment.

The base station sends the downlink sending parameter and the downlink data to the user equipment. The downlink sending parameter and the downlink data may be sent to the user equipment together or may be sequentially sent to the user equipment.

The base station may add notification information to the downlink data to notify the user equipment that when subsequently sending uplink data, the user equipment does not need to re-determine a sequence, but sends the uplink data by using the second target uplink sending parameter, until sending of the uplink data is completed.

In this case, the user equipment demodulates and decodes, according to the downlink sending parameter, the downlink data sent by the base station.

In this embodiment, the base station receives the third target sequence that is determined by the user equipment according to the current channel quality. The base station may demodulate and decode the uplink data according to the third target sequence, may further determine the current channel quality according to the third target sequence, and determines the downlink sending parameter according to the current channel quality. In this embodiment, the base station may determine the uplink sending parameter and the current channel quality by using the third target sequence, without selecting an uplink sending parameter according to channel quality. The base station may determine the uplink sending parameter and the current channel quality without sending a sounding signal, so that network overheads are low and efficiency is high.

Figure 5:
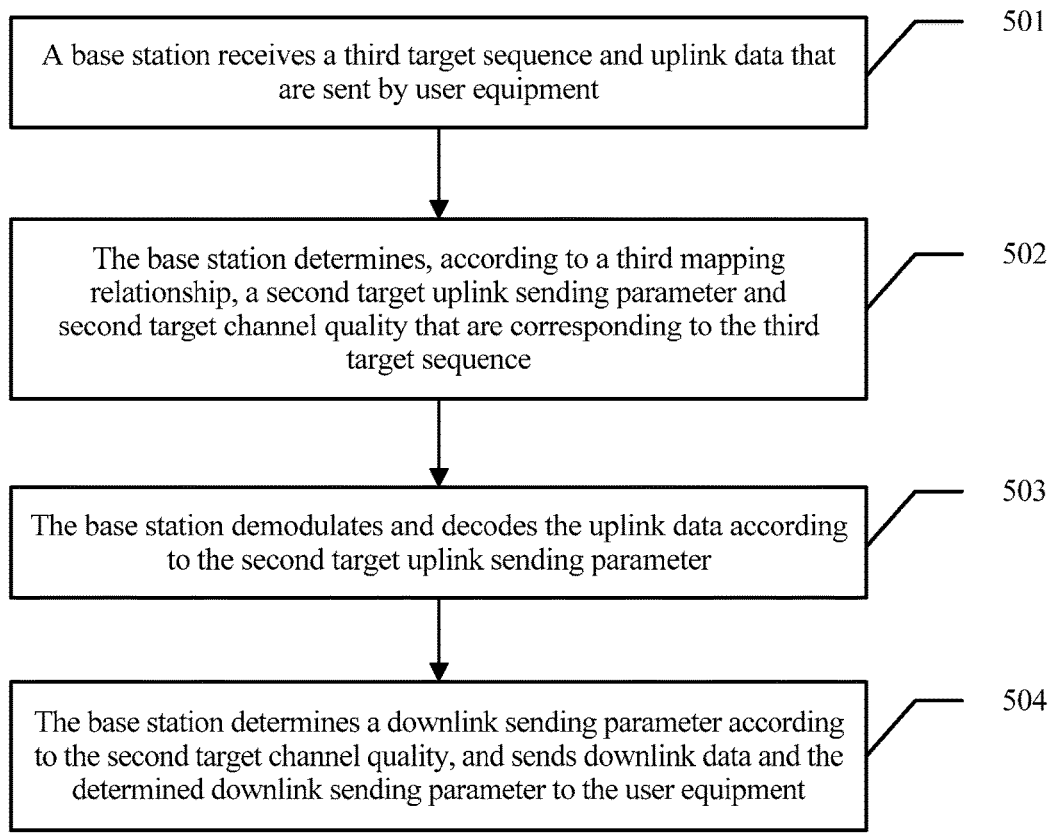
FIG. 5 is a step flowchart of an embodiment of a data transmission method according to the embodiments of the present invention.

The embodiment shown in FIG. 5 describes how to further improve data transmission efficiency. With reference to an embodiment shown in FIG. 6, the following describes how the base station generates the third mapping relationship.

601. The base station establishes the third mapping relationship.

The base station pre-establishes the third mapping relationship. The third mapping relationship is used to indicate a correspondence between a sequence and each of an uplink sending parameter and channel quality.

Specifically, different uplink sending parameters are corresponding to different channel quality. The third mapping relationship includes a correspondence between a sequence and an uplink sending parameter and a correspondence between the sequence and channel quality.

That is, the base station may determine, by using the sequence, an uplink sending parameter and current channel quality that are used by the user equipment to send uplink data.

602. The base station sends the third mapping relationship to the user equipment.

The base station sends the established third mapping relationship to the user equipment, so that the user equipment selects an uplink sending parameter according to current channel quality determined by the user equipment, and determines, according to the third mapping relationship, a third target sequence corresponding to the selected uplink sending parameter.

Specifically, the base station may send the third mapping relationship to the user equipment by using a downlink control channel or send the third mapping relationship to the user equipment by means of system broadcast.

603. The base station receives a third target sequence and uplink data that are sent by the user equipment.

604. The base station determines, according to the third mapping relationship, a second target uplink sending parameter and second target channel quality that are corresponding to the third target sequence.

605. The base station demodulates and decodes the uplink data according to the second target uplink sending parameter.

606. The base station determines a downlink sending parameter according to the second target channel quality, and sends downlink data and the determined downlink sending parameter to the user equipment.

Processes shown in step 603 to step 606 in this embodiment are the same as processes of steps 501 to 504 shown in FIG. 5. Details are not described in this embodiment.

In this embodiment, the base station may establish the third mapping relationship that is used to indicate the correspondence between a sequence and each of an uplink sending parameter and channel quality, and receives the third target sequence sent by the user equipment. The base station may determine, according to the third mapping relationship, the second target uplink sending parameter and the second target channel quality that are corresponding to the third target sequence, then demodulates and decodes the uplink data according to the second target uplink sending parameter, and determines the downlink sending parameter according to the second target channel quality. In this embodiment, the base station may determine the second target uplink sending parameter and the second target channel quality according to the third mapping relationship established by the base station. Therefore, data transmission efficiency is effectively improved, and in a data transmission process, network overheads are low and data transmission efficiency is improved.

Figure 6:
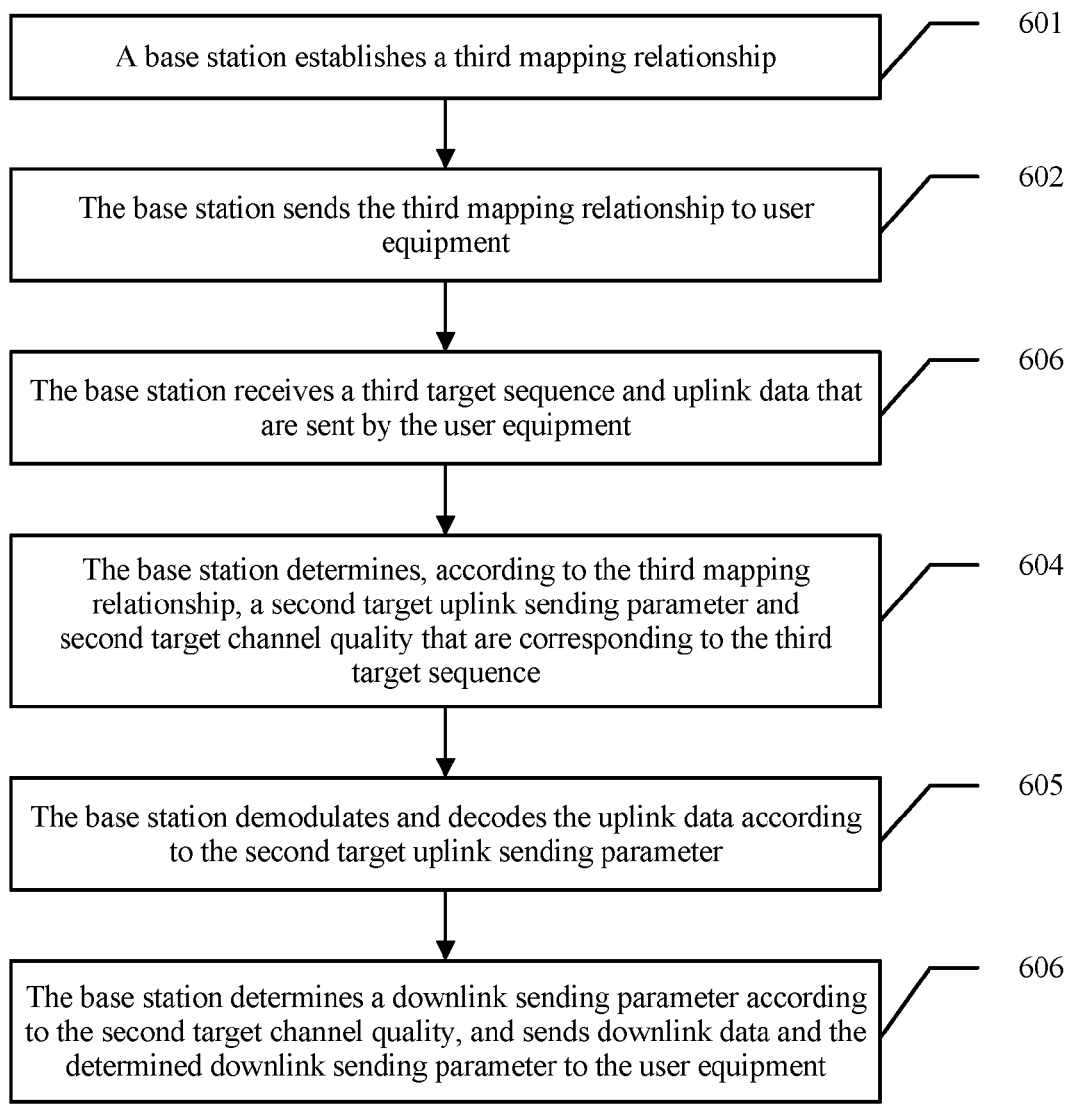
FIG. 6 is a step flowchart of an embodiment of a data transmission method according to the embodiments of the present invention.
Figure 7:
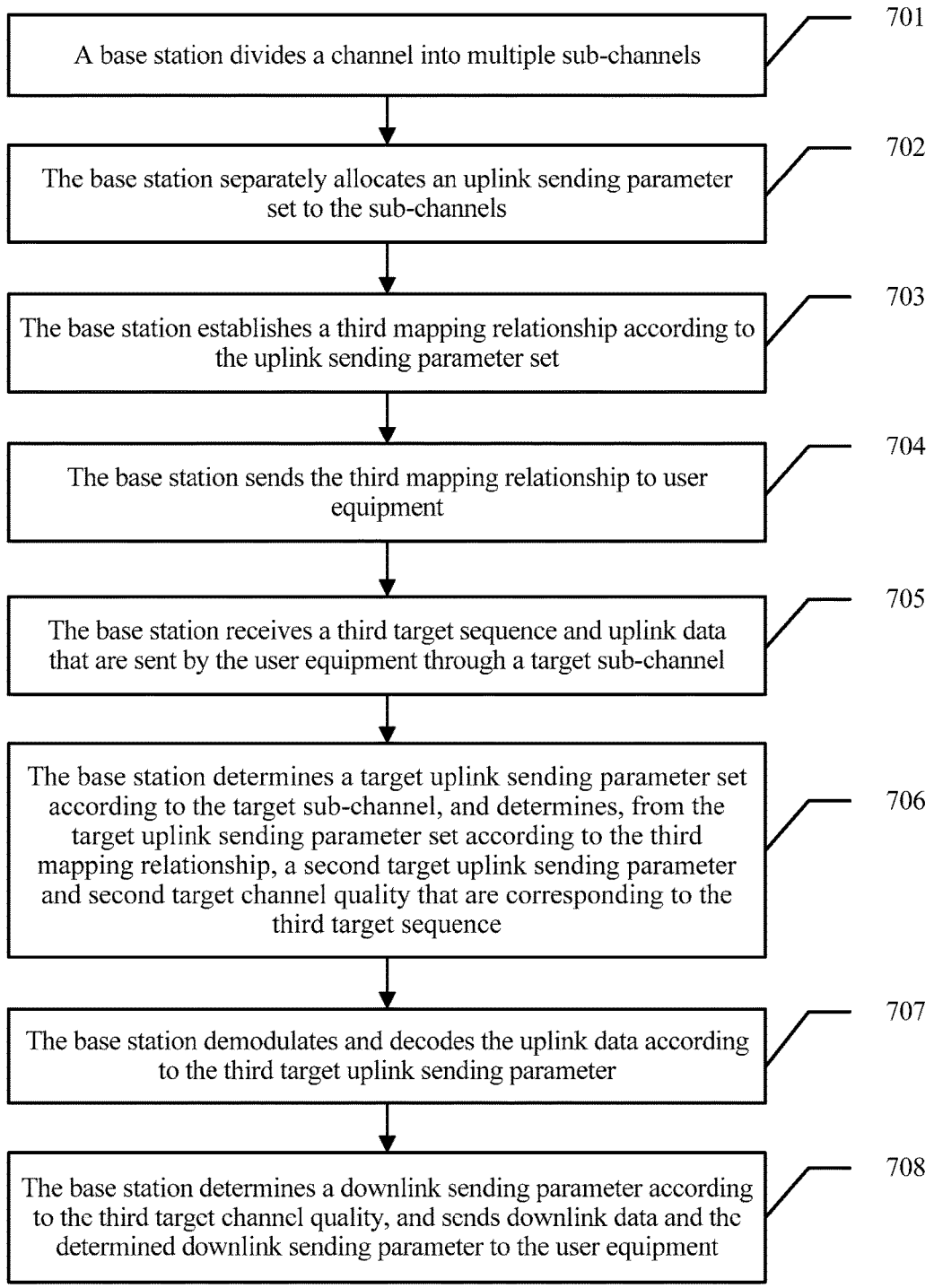
FIG. 7 is a step flowchart of another embodiment of a data transmission method according to the embodiments of the present invention.

The embodiment shown in FIG. 6 describes how the base station generates the third mapping relationship. With reference to an embodiment shown in FIG. 7, the following describes how the base station further reduces decoding complexity of the base station.

701. The base station divides a channel into multiple sub-channels.

The base station divides the channel into the multiple sub-channels, where the sub-channels are mutually orthogonal.

702. The base station separately allocates an uplink sending parameter set to the sub-channels.

The uplink sending parameter set includes an uplink sending parameter that may be used by the user equipment when the user equipment sends uplink data.

The uplink sending parameter set may include one or more uplink sending parameters, or the sending parameter set may be empty.

703. The base station establishes the third mapping relationship according to the uplink sending parameter set.

After determining uplink sending parameter sets, the base station separately establishes third mapping relationships in the uplink sending parameter sets.

The third mapping relationship is used to indicate a correspondence between a sequence and each of channel quality and the uplink sending parameter in the uplink sending parameter set.

Third mapping relationships are separately established in uplink sending parameter sets corresponding to sub-channels. Therefore, on different sub-channels, a same sequence may be used to correspond to an uplink sending parameter and channel quality.

That is, sequences on different sub-channels may be reused, and there are fewer uplink sending manners and less channel quality in the uplink sending parameter sets corresponding to the sub-channels, which effectively reduces a quantity of sequences.

704. The base station sends the third mapping relationship to the user equipment.

The third mapping relationships established by the base station belong to the uplink sending parameter sets allocated by the base station to the sub-channels. Therefore, the third mapping relationships are respectively corresponding to the sub-channels.

The base station separately sends the third mapping relationships to the user equipment by using the sub-channels corresponding to the third mapping relationships, or may send the third mapping relationship and a correspondence between the third mapping relationship and a sub-channel to the user equipment by means of system broadcast.

705. The base station receives the third target sequence and the uplink data that are sent by the user equipment by using a target sub-channel.

After the base station sends the third mapping relationship to the user equipment, the user equipment selects an uplink sending parameter according to determined current channel quality, determines, according to the selected uplink sending parameter, a target uplink sending parameter set to which the uplink sending parameter belongs, and determines a sub-channel corresponding to the target uplink sending parameter set, and the user equipment determines, according to the third mapping relationship, a third target sequence corresponding to the selected uplink sending parameter.

706. The base station determines the target uplink sending parameter set according to the target sub-channel, and determines, from the target uplink sending parameter set according to the third mapping relationship, a second target uplink sending parameter and second target channel quality that are corresponding to the third target sequence.

The base station determines the target sub-channel that is used to receive the uplink data and the third target sequence that are sent by the user equipment.

The base station determines the target uplink sending parameter set corresponding to the target sub-channel, and determines the third mapping relationship that is pre-established in the target uplink sending parameter set.

The base station determines, according to the third mapping relationship, the second target uplink sending parameter and the second target channel quality that are corresponding to the third target sequence.

707. The base station demodulates and decodes the uplink data according to the second target uplink sending parameter.

708. The base station determines a downlink sending parameter according to the third target channel quality, and sends downlink data and the determined downlink sending parameter to the user equipment.

The base station sends the downlink sending parameter and the downlink data to the user equipment. The downlink sending parameter and the downlink data may be sent to the user equipment together or may be sequentially sent to the user equipment. In this case, the user equipment demodulates and decodes, according to the downlink sending parameter, the downlink data sent by the base station.

In this embodiment, the base station divides the channel into the multiple sub-channels, separately allocates the uplink sending parameter set to the sub-channels, and establishes the third mapping relationships in the uplink sending parameter sets. The third mapping relationship indicates the correspondence between a sequence and each of channel quality and the uplink sending parameter in the uplink sending parameter set. According to this embodiment, sequences on different sub-channels may be reused, which effectively reduces a quantity of sequences, and effectively reduces decoding complexity of the base station. In addition, the base station may determine the current channel quality according to the third target sequence, without detecting the current channel quality, which improves data transmission efficiency.

Figure 8:
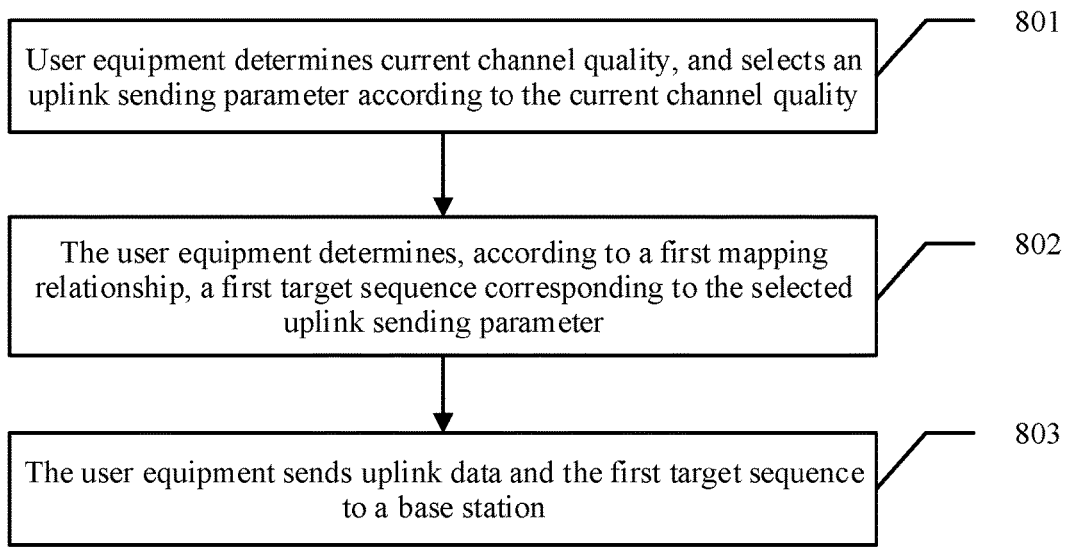
FIG. 8 is a step flowchart of an embodiment of a data transmission method according to the embodiments of the present invention.

With reference to an embodiment shown in FIG. 8, the following describes how user equipment implements data transmission.

801. The user equipment determines current channel quality, and selects an uplink sending parameter according to the current channel quality.

The user equipment determines the current channel quality, and the user equipment selects the uplink sending parameter according to the determined current channel quality.

A manner of selecting the uplink sending parameter by the user equipment may be: The user equipment selects the uplink sending parameter according to a preset criterion. The preset criterion may be notified by a base station to the user equipment by means of system broadcast, or may be determined by the user equipment according to a configuration of the user equipment.

802. The user equipment determines, according to a first mapping relationship, a first target sequence corresponding to the selected uplink sending parameter.

The first mapping relationship is used to indicate a correspondence between the uplink sending parameter and a sequence.

After selecting the uplink sending parameter, the user equipment may determine, according to the first mapping relationship, the first target sequence corresponding to the uplink sending parameter.

803. The user equipment sends uplink data and the first target sequence to the base station.

After determining the first target sequence, the user equipment sends the uplink data to the base station by using the selected uplink sending parameter, so that the base station determines, according to the first mapping relationship, a first target uplink sending parameter corresponding to the first target sequence and demodulates and decodes the uplink data according to the first target uplink sending parameter.

In this embodiment, the user equipment determines the current channel quality, selects the uplink sending parameter according to the current channel quality, determines, according to the first mapping relationship, the first target sequence corresponding to the uplink sending parameter, and sends the first target sequence to the base station, so that the base station can determine, according to the first target sequence, the uplink sending parameter for sending the uplink data by the user equipment. According to this embodiment of the present invention, the uplink sending parameter does not need to be determined by sending a sounding reference signal by the base station, but is selected by the user equipment. Therefore, if the user equipment sends a relatively small amount of data, the user equipment can notify the base station of an uplink sending parameter used to send the uplink data, which effectively reduces network overheads and improves data transmission efficiency.

Figure 9:
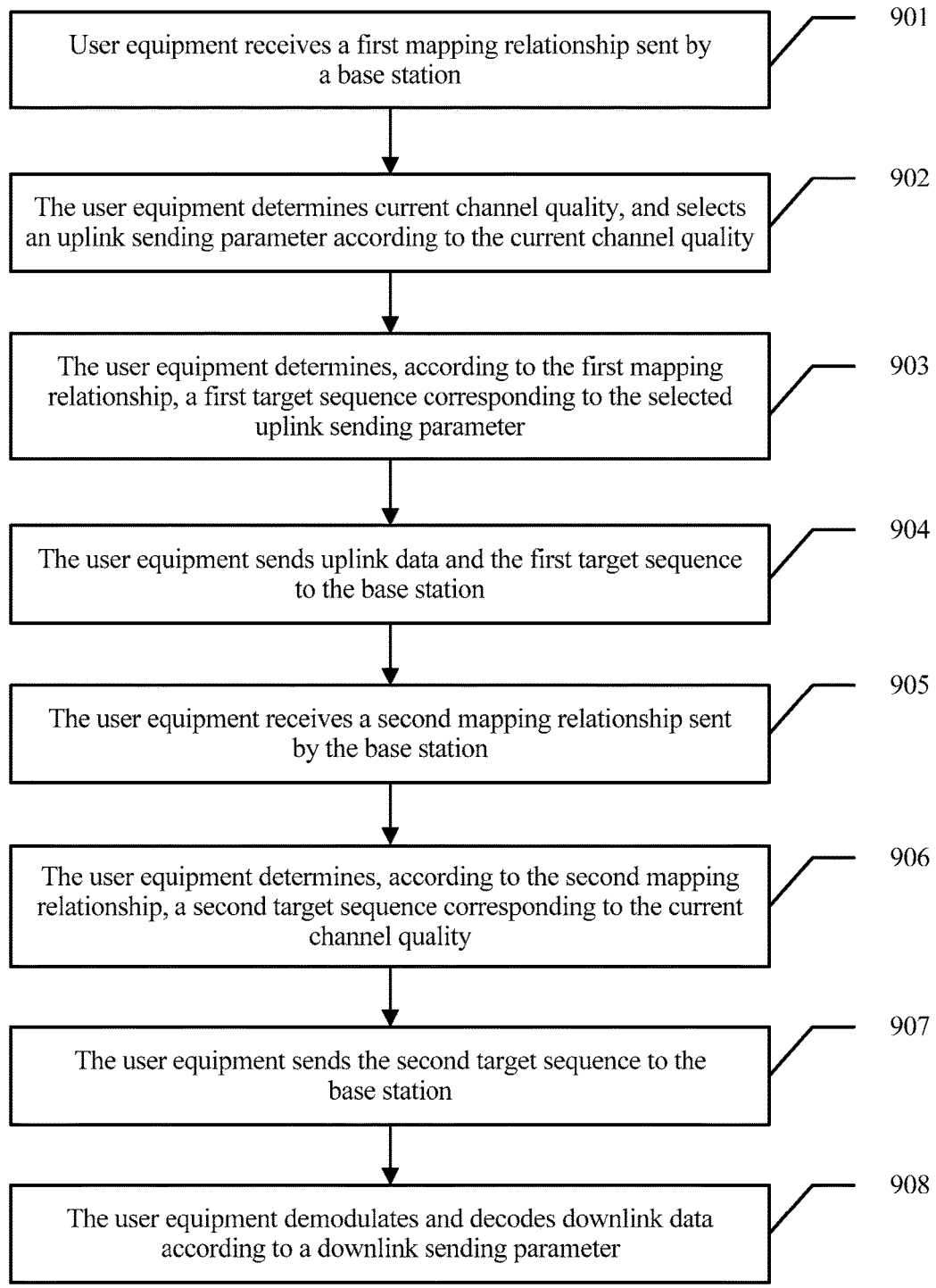
FIG. 9 is a step flowchart of another embodiment of a data transmission method according to the embodiments of the present invention.

The embodiment shown in FIG. 8 describes how the user equipment implements data transmission. With reference to an embodiment shown in FIG. 9, the following describes how the user equipment changes a sending manner.

901. The user equipment receives a first mapping relationship sent by the base station.

The first mapping relationship is established by the base station and used to indicate a correspondence between different uplink sending parameters and different sequences.

The uplink sending parameter includes but is not limited to an uplink data decoding scheme, a modulation scheme, uplink data transmit power, and a quantity of repetition times.

The user equipment may receive the first mapping relationship by means of system broadcast or by using a downlink control channel.

902. The user equipment determines current channel quality, and selects an uplink sending parameter according to the current channel quality.

903. The user equipment determines, according to the first mapping relationship, a first target sequence corresponding to the selected uplink sending parameter.

904. The user equipment sends uplink data and the first target sequence to the base station.

Processes of step 902 to step 904 in this embodiment are the same as processes of step 801 to step 803 in the embodiment shown in FIG. 8. Details are not described in this embodiment.

905. The user equipment receives a second mapping relationship sent by the base station.

The second mapping relationship is used to indicate a correspondence between different channel quality and a sequence.

906. The user equipment determines, according to the second mapping relationship, a second target sequence corresponding to the current channel quality.

The user equipment determines, according to the second mapping relationship received by the user equipment, the second target sequence corresponding to the current channel quality.

907. The user equipment sends the second target sequence to the base station.

After determining the second target sequence, the user equipment sends the second target sequence to the base station, so that the base station determines, according to the second mapping relationship, first target channel quality corresponding to the second target sequence, determines a downlink sending parameter according to the first target channel quality, and sends downlink data and the determined downlink sending parameter to the user equipment.

908. The user equipment demodulates and decodes the downlink data according to the downlink sending parameter.

The user equipment receives the downlink data and the downlink sending parameter that are sent by the base station and demodulates and decodes the downlink data according to the downlink sending parameter.

After the demodulation and decoding, if the user equipment determines that the downlink data carries notification information that is used to notify the user equipment that when subsequently sending uplink data, the user equipment does not need to re-determine a sequence, when the user equipment continues to send uplink data, the user equipment sends the uplink data directly by using the current selected uplink sending parameter.

In this embodiment, the user equipment receives the second mapping relationship sent by the base station; the user equipment determines, according to the second mapping relationship received by the user equipment, the second target sequence corresponding to the current channel quality, and sends the second target sequence to the base station, so that the base station determines the current channel quality according to the second target sequence and sends the downlink data and the downlink sending parameter; and the user equipment receives the downlink data. In this embodiment, if the user equipment sends a relatively large amount of uplink data and sending of the relatively large amount of uplink data cannot be completed at a time, the user equipment may determine, according to the downlink data sent by the base station, that when subsequently sending uplink data, the user equipment does not need to re-determine a sequence, but sends the uplink data directly by using the selected uplink sending parameter, which improves data transmission efficiency.

Figure 10:
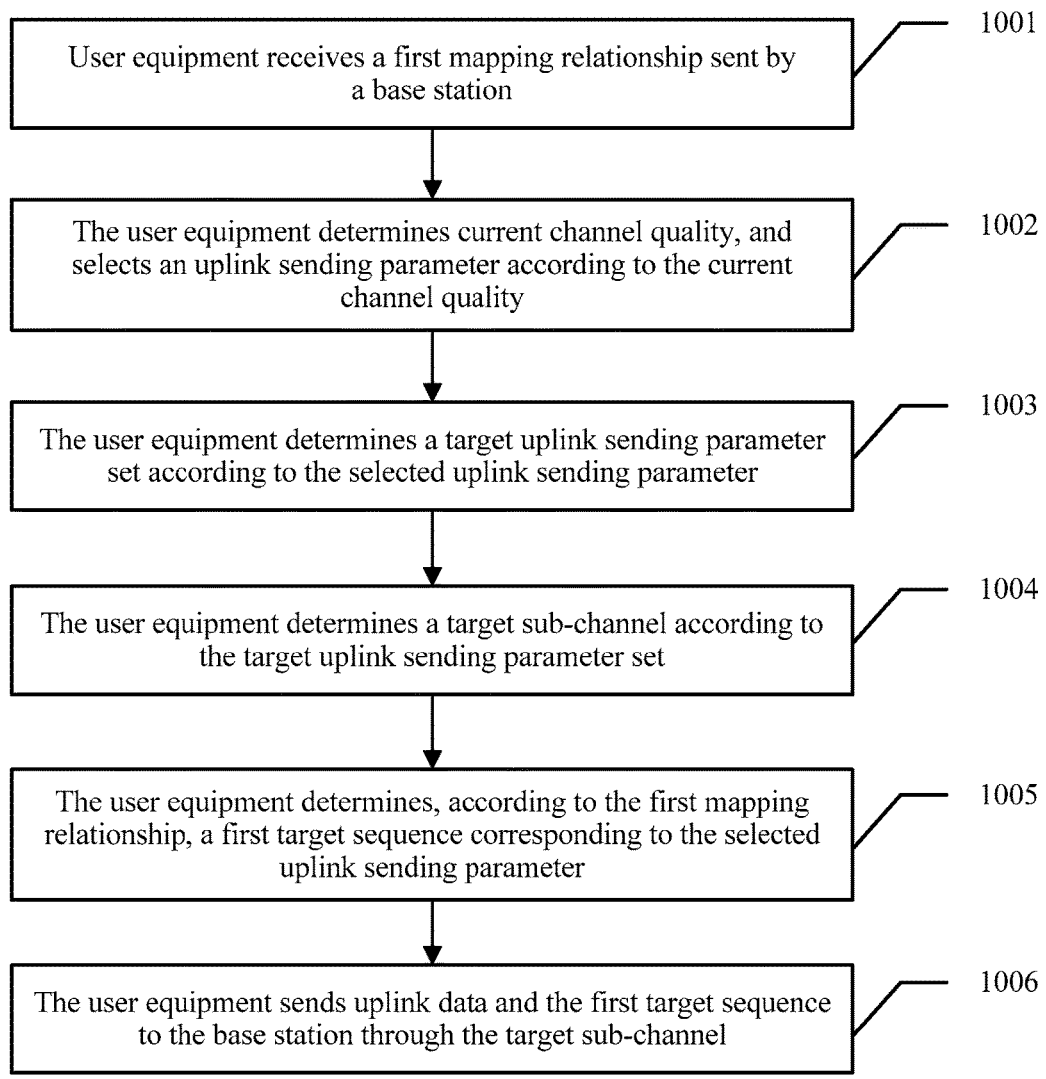
FIG. 10 is a step flowchart of another embodiment of a data transmission method according to the embodiments of the present invention.

The embodiment shown in FIG. 8 describes how the user equipment implements data transmission. With reference to an embodiment shown in FIG. 10, the following describes how the user equipment sends uplink data by using a sub-channel.

1001. The user equipment receives a first mapping relationship sent by the base station.

The first mapping relationship is used to indicate a correspondence between a sequence and the uplink sending parameter in an uplink sending parameter set, the uplink sending parameter set is separately allocated by the base station to sub-channels, the sub-channels are determined by the base station by dividing a channel, and the sub-channels are mutually orthogonal.

The user equipment receives the first mapping relationship and can determine a sub-channel to which the first mapping relationship belongs.

The user equipment may receive the first mapping relationship by means of system broadcast or by using a downlink control channel.

1002. The user equipment determines current channel quality, and selects an uplink sending parameter according to the current channel quality.

The user equipment selects the uplink sending parameter according to a preset criterion. The preset criterion may be notified by the base station to the user equipment by means of system broadcast, or may be determined by the user equipment according to a configuration of the user equipment.

1003. The user equipment determines a target uplink sending parameter set according to the selected uplink sending parameter.

The selected uplink sending parameter belongs to the target uplink sending parameter set.

1004. The user equipment determines a target sub-channel according to the target uplink sending parameter set.

The target uplink sending parameter set is pre-allocated by the base station to the target sub-channel. Therefore, the target sub-channel is corresponding to the target uplink sending parameter set.

1005. The user equipment determines, according to the first mapping relationship, a first target sequence corresponding to the selected uplink sending parameter.

1006. The user equipment sends the first target sequence and the uplink data to the base station by using the target sub-channel.

The user equipment determines the target sub-channel and sends the first target sequence and the uplink data to the base station by using the sub-channel, so that the base station determines the target uplink sending parameter set according to the target sub-channel and determines, from the target uplink sending parameter set according to the first mapping relationship, a first target uplink sending parameter corresponding to the first target sequence.

In this embodiment, the user equipment receives the first mapping relationship sent by the base station, where the first mapping relationship is used to indicate the correspondence between a sequence and the uplink sending parameter in the uplink sending parameter set; and the user equipment determines the current channel quality, selects the uplink sending parameter according to the current channel quality, determines the target sub-channel and the first target sequence, and sends the first target sequence to the base station by using the target sub-channel. In this embodiment, sequences on different sub-channels may be reused. Therefore, a quantity of sequences is reduced, and decoding complexity of the base station is reduced. In addition, because a relatively small quantity of uplink sending parameters is in the first mapping relationship on the sub-channel, the user equipment can quickly determine a sequence corresponding to the uplink sending parameter, which effectively improves data transmission efficiency.

Figure 11:
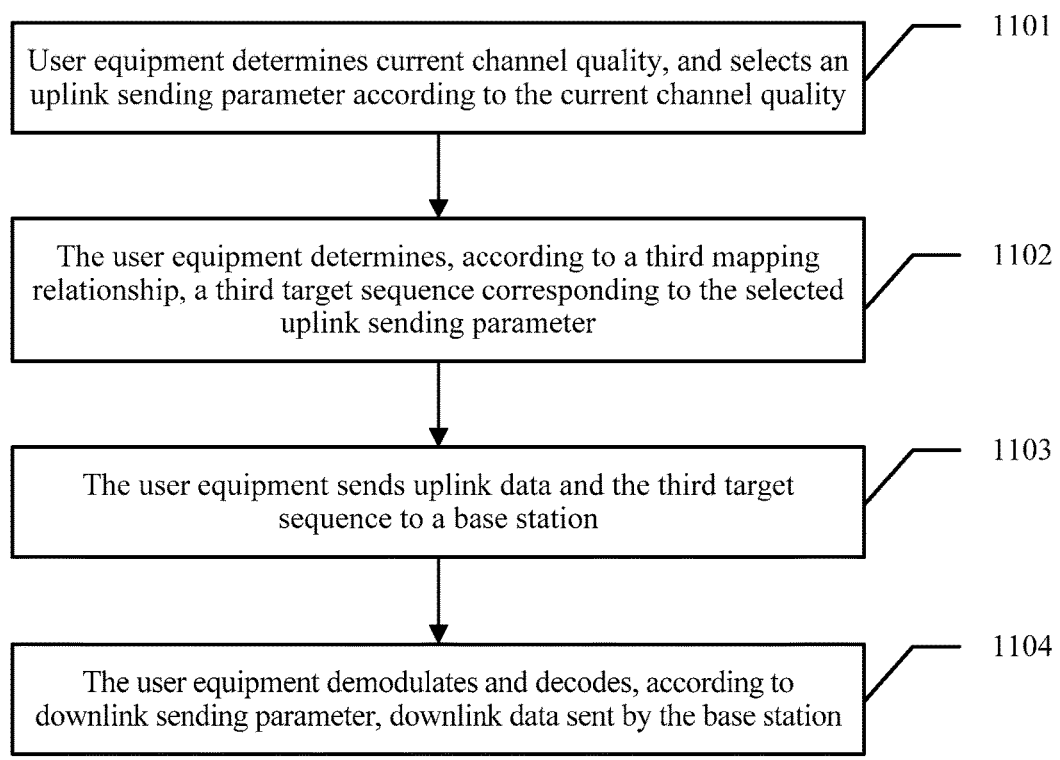
FIG. 11 is a step flowchart of an embodiment of a data transmission method according to the embodiments of the present invention.

With reference to an embodiment shown in FIG. 11, the following describes how user equipment reduces a quantity of sequence sending times in a data transmission process.

1101. The user equipment determines current channel quality, and selects the uplink sending parameter according to the current channel quality.

The user equipment determines the current channel quality, and selects, according to the current channel quality selected by the user equipment, the uplink sending parameter used to send uplink data.

1102. The user equipment determines, according to a third mapping relationship, a third target sequence corresponding to the selected uplink sending parameter.

The third mapping relationship is used to indicate a correspondence between a sequence and each of an uplink sending parameter and channel quality.

1103. The user equipment sends the third target sequence and the uplink data to the base station.

The user equipment sends the third target sequence and the uplink data to the base station, so that the base station determines, according to the third mapping relationship, a second target uplink sending parameter and second target channel quality that are corresponding to the third target sequence, and the base station demodulates and decodes the uplink data according to the second target uplink sending parameter, determines a downlink sending parameter according to the second target channel quality, and sends downlink data and the determined downlink sending parameter to the user equipment.

1104. The user equipment demodulates and decodes, according to the downlink sending parameter, downlink data sent by the base station.

The downlink data may carry notification information to notify the user equipment that when subsequently sending uplink data, the user equipment does not need to re-determine a sequence, but sends the uplink data by using the second target uplink sending parameter, until sending of the uplink data is completed.

In this embodiment, the user equipment determines the current channel quality, and selects the uplink sending parameter according to the current channel quality; and the user equipment sends the third target sequence and the uplink data to the base station and receives the downlink data sent by the base station. In this embodiment, the base station may determine the uplink sending parameter and the current channel quality according to the third target sequence, provided that the user equipment sends the third target sequence to the base station. In this case, if the user equipment sends a relatively large amount of uplink data and sending of the relatively large amount of uplink data cannot be completed at a time, the user equipment does not need to re-send a sequence that is used for determining current channel quality, which improves data transmission efficiency.

Figure 12:
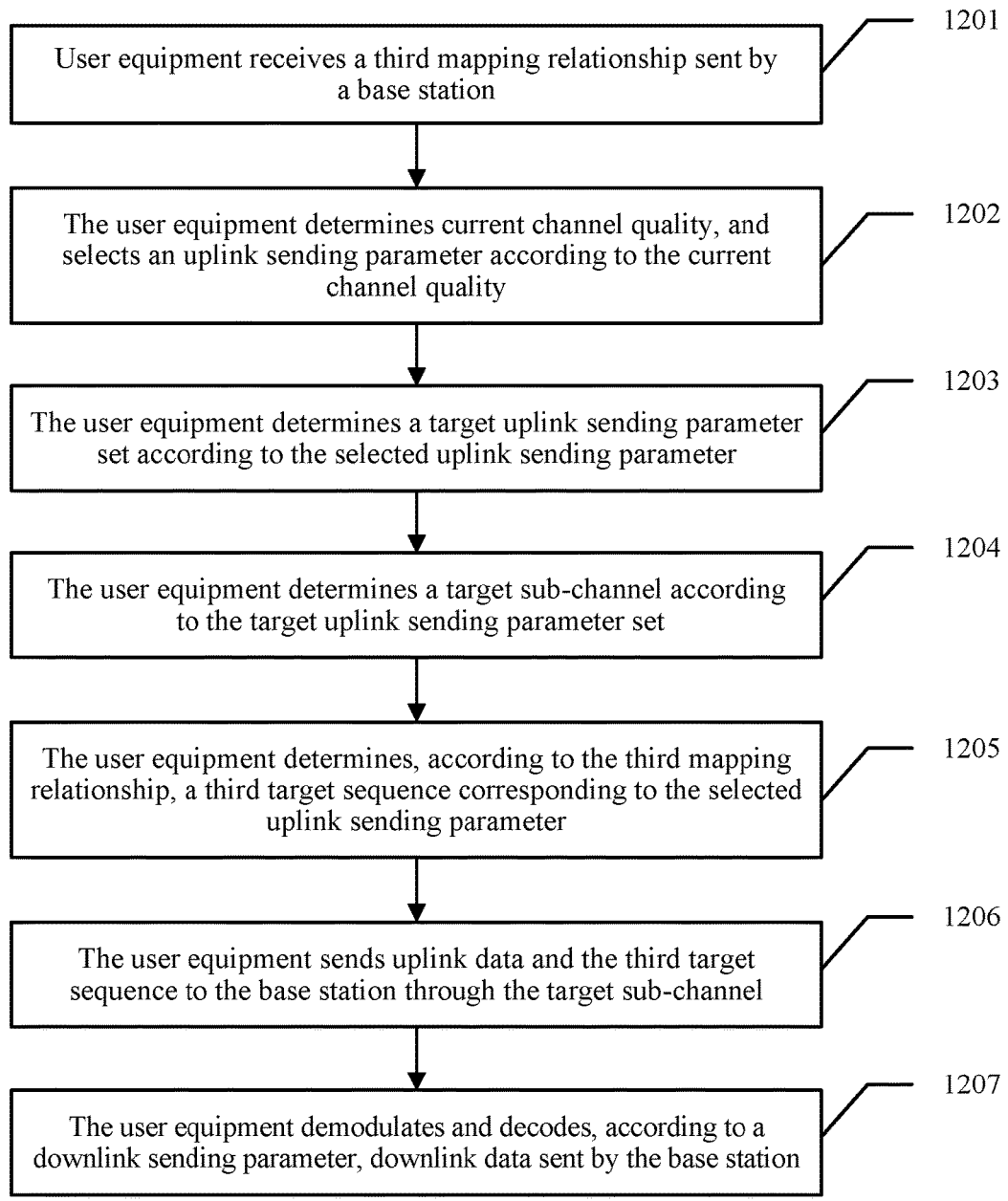
FIG. 12 is a step flowchart of another embodiment of a data transmission method according to the embodiments of the present invention.

The embodiment shown in FIG. 11 describes how the user equipment reduces a quantity of sequence sending times in a data transmission process. With reference to an embodiment shown in FIG. 12, the following describes how to improve a speed of determining the third target sequence by the user equipment.

1201. The user equipment receives a third mapping relationship sent by the base station.

The base station establishes the third mapping relationship. The third mapping relationship is used to indicate a correspondence between a sequence and each of an uplink sending parameter and channel quality.

In this embodiment, the third mapping relationship is used to indicate a correspondence between a sequence and each of channel quality and the uplink sending parameter in an uplink sending parameter set, the uplink sending parameter set is separately allocated by the base station to sub-channels, the sub-channels are determined by the base station by dividing a channel, and the sub-channels are mutually orthogonal.

The user equipment may receive the third mapping relationship by means of system broadcast or by using a downlink control channel.

1202. The user equipment determines current channel quality, and selects the uplink sending parameter according to the current channel quality.

The user equipment determines the current channel quality, and selects, according to the determined current channel quality, the uplink sending parameter used to send uplink data.

1203. The user equipment determines a target uplink sending parameter set according to the selected uplink sending parameter.

The selected uplink sending parameter belongs to the target uplink sending parameter set.

1204. The user equipment determines a target sub-channel according to the target uplink sending parameter set.

The target sub-channel is corresponding to the target uplink sending parameter set.

1205. The user equipment determines, according to the third mapping relationship, a third target sequence corresponding to the selected uplink sending parameter.

1206. The user equipment sends the third target sequence and the uplink data to the base station by using the target sub-channel.

The user equipment sends the third target sequence and the uplink data to the base station, so that the base station determines the target uplink sending parameter set according to the target sub-channel and determines, from the target uplink sending parameter set according to the third mapping relationship, a second target uplink sending parameter and second target channel quality that are corresponding to the third target sequence.

The user equipment enables the base station to demodulate and decode the uplink data according to the second target uplink sending parameter, determine a downlink sending parameter according to the second target channel quality, and send downlink data and the determined downlink sending parameter to the user equipment.

1207. The user equipment demodulates and decodes, according to the downlink sending parameter, downlink data sent by the base station.

The downlink data may carry notification information to notify the user equipment that when subsequently sending uplink data, the user equipment does not need to re-determine a sequence, but sends the uplink data by using the second target uplink sending parameter, until sending of the uplink data is completed.

In this embodiment, the user equipment receives the third mapping relationship sent by the base station, where the third mapping relationship is used to indicate the correspondence between a sequence and each of channel quality and the uplink sending parameter in the uplink sending parameter set; the user equipment determines the current channel quality, selects the uplink sending parameter according to the current channel quality, and determines the target uplink sending parameter set according to the selected uplink sending parameter; and the user equipment determines the target sub-channel according to the target uplink sending parameter set, and determines, according to the third mapping relationship, the third target sequence corresponding to the selected uplink sending parameter, so that the base station determines the second target channel quality according to the third target sequence. According to this embodiment, the base station may determine the second target channel quality provided that the user equipment sends the third target sequence to the base station, which reduces a quantity of sequence sending times and improves data transmission efficiency.

The foregoing embodiments describe the data transmission method in detail. To better understand the embodiments of the present invention, the following further describes in detail the embodiments of the present invention by using specific application scenarios.

The base station pre-determines an uplink sending parameter that may be used by the user equipment to send uplink data.

The uplink sending parameter is an uplink data decoding scheme, a modulation scheme, uplink data transmit power, a quantity of repetition times, and the like.

The base station divides a channel into N (where N is greater than 1) sub-channels.

Different quantities of repetition times may be used for the sub-channels. For example, a sub-channel 1 is repeatedly used for eight times, a sub-channel 2 is repeatedly used for 64 times, and a sub-channel 3 is not repeatedly used.

The base station separately allocates an uplink sending parameter set to the sub-channels.

The uplink sending parameter set includes M (where M is greater than or equal to 0) uplink sending parameters.

The base station allocates a sequence to uplink sending parameters in each uplink sending parameter set.

Sequences in an uplink sending parameter set are different from each other, but sequences in different uplink sending parameter sets may be the same.

The base station establishes the first mapping relationship according to the uplink sending parameter set, where the first mapping relationship is used to indicate a correspondence between different sequences and different uplink sending parameters in the uplink sending parameter set.

The base station notifies the user equipment of the first mapping relationship by means of system broadcast.

The user equipment determines current channel quality when sending the uplink data. The current channel quality includes a signal to interference plus noise ratio, a bit error rate, or a symbol error rate.

In this application scenario, the signal to interference plus noise ratio is used as an example.

That is, the user equipment determines a signal to interference plus noise ratio of a current channel.

The user equipment selects an uplink sending parameter according to the signal to interference plus noise ratio (SINR).

The base station may notify, by means of system broadcast, the user equipment of a manner of selecting the corresponding uplink sending parameter according to the SINR.

In this application scenario, when the base station notifies the user equipment that if SINR<a1, the user equipment determines that the uplink sending parameter is S1; if a1≤SINR<a2, the user equipment determines that the uplink sending parameter is S2; and if SINR≥am, the user equipment determines that the uplink sending parameter is S3.

The user equipment determines that the current SINR≥am, and therefore, the user equipment determines that the used uplink sending parameter is S3.

The user equipment determines, according to the selected uplink sending parameter, a target uplink sending parameter set to which S3 belongs.

The user equipment determines a first mapping relationship corresponding to the target uplink sending parameter set.

The user equipment determines a target sub-channel according to the target uplink sending parameter set.

For the first mapping relationship determined by the user equipment, reference may be made to Table 1.

TABLE 1

| Sequence | Uplink sending parameter |
|---|---|
| 1 | S1 |
| 2 | S2 |
| 3 | S3 |

The user equipment determines, according to the first mapping relationship, a first target sequence corresponding to the selected uplink sending parameter.

In this application scenario, the user equipment determines that the first target sequence corresponding to the uplink sending parameter S3 is 3.

The user equipment sends the sequence 3 and the uplink data to the base station by using the target sub-channel.

The base station receives, by using the target sub-channel, the sequence 3 and the uplink data that are sent by the user equipment.

The base station determines the target uplink sending parameter set according to the target sub-channel.

The base station determines the first mapping relationship established in the target uplink sending parameter set, that is, Table 1.

The base station determines, according to the first mapping relationship, a first target uplink sending parameter corresponding to the sequence 3, that is, S3.

The base station demodulates and decodes the uplink data according to S3.

If the uplink data received by the base station carries indication information that is used to indicate a size of uplink data, the base station determines, according to the indication information, that the user equipment needs to continue to send uplink data.

The base station establishes a second mapping relationship. The second mapping relationship is used to indicate a correspondence between different channel quality and a sequence.

For the second mapping relationship, refer to Table 2.

TABLE 2

| Sequence | Channel quality |
|---|---|
| 5 | SINR < a1 |
| 6 | a1 ≤ SINR < a2 |
| 7 | SINR ≥ am |

The base station sends the second mapping relationship to the user equipment.

The user equipment determines, according to the second mapping relationship, a second target sequence corresponding to the current channel quality.

In this application scenario, the user equipment has determined that the SINR≥am, and therefore, the user equipment may determine, according to the second mapping relationship, that the second target sequence is 7.

The user equipment sends the sequence 7 to the base station.

The base station receives the sequence 7, and determines, according to the second mapping relationship, the current channel quality corresponding to the sequence 7, that is, determines that the current channel quality is the SINR≥am.

The base station determines a downlink sending parameter according to the SINR≥am, and sends downlink data and the determined downlink sending parameter to the user equipment.

The user equipment demodulates and decodes the downlink data according to the downlink sending parameter.

When the downlink data carries notification information that is used to notify the user equipment that when subsequently sending uplink data, the user equipment does not need to re-determine a sequence, when the user equipment continues to send uplink data, the user equipment sends the uplink data directly by using the current selected uplink sending parameter (S3).

The foregoing embodiments describe the data transmission method. With reference to an embodiment shown in FIG. 13, the following describes a specific structure of a base station in detail.

In this embodiment, the base station includes:

a first receiving unit 1301, configured to receive a first target sequence and uplink data that are sent by user equipment;

a first determining unit 1302, configured to determine, according to a first mapping relationship, a first target uplink sending parameter corresponding to the first target sequence, where the first mapping relationship is used to indicate a correspondence between an uplink sending parameter and a sequence; and a first processing unit 1303, configured to demodulate and decode the uplink data according to the first target uplink sending parameter.

In this embodiment, the first determining unit 1302 determines, according to the first mapping relationship, the first target uplink sending parameter corresponding to the first target sequence, so that the first processing unit 1303 demodulates and decodes the uplink data. In this embodiment, the user equipment determines the first target uplink sending parameter and notifies the base station of the first target uplink sending parameter in a form of a sequence. Therefore, in a process of sending the uplink data, overheads are low and efficiency is high, preventing a disadvantage of excessively high network overheads and low efficiency caused because the base station configures and sends a sounding reference signal to measure channel quality.

Figure 13:
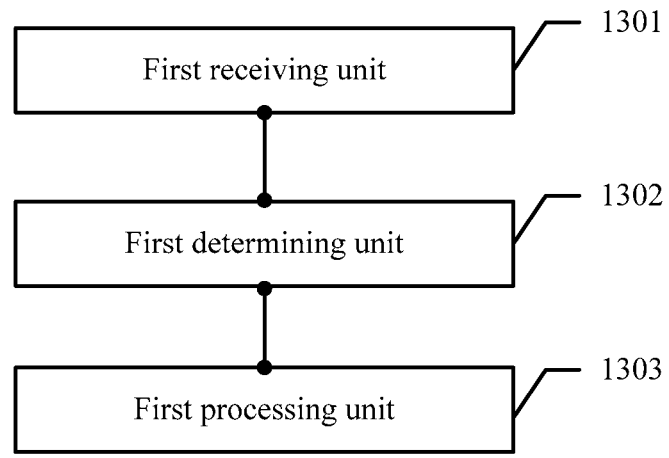
FIG. 13 is a schematic structural diagram of an embodiment of a base station according to the embodiments of the present invention.

The embodiment shown in FIG. 13 describes the specific structure of the base station in detail. With reference to an embodiment shown in FIG. 14, the following describes a specific structure of a base station that can generate the first mapping relationship.

In this embodiment, the base station includes:

a first establishment unit 1401, configured to establish the first mapping relationship;

a first sending unit 1402, configured to send the first mapping relationship to the user equipment, so that the user equipment selects an uplink sending parameter according to current channel quality and determines, according to the first mapping relationship, a first target sequence corresponding to the selected uplink sending parameter;

a first receiving unit 1403, configured to receive uplink data and the first target sequence that are sent by the user equipment;

a first determining unit 1404, configured to determine, according to the first mapping relationship, a first target uplink sending parameter corresponding to the first target sequence, where the first mapping relationship is used to indicate a correspondence between an uplink sending parameter and a sequence; and a first processing unit 1405, configured to demodulate and decode the uplink data according to the first target uplink sending parameter.

In this embodiment, the first establishment unit 1401 establishes the first mapping relationship, and then, after the first receiving unit 1403 receives the first target sequence sent by the user equipment, the first determining unit 1404 may determine, according to the first mapping relationship established by the first determining unit 1404, the first target uplink sending parameter corresponding to the first target sequence, and then the first processing unit 1405 demodulates and decodes the uplink data according to the first target uplink sending parameter. Therefore, the base station may determine the uplink sending parameter according to the first mapping relationship, without sending a sounding reference signal to measure channel quality, which reduces network overheads and improves efficiency.

Figure 14:
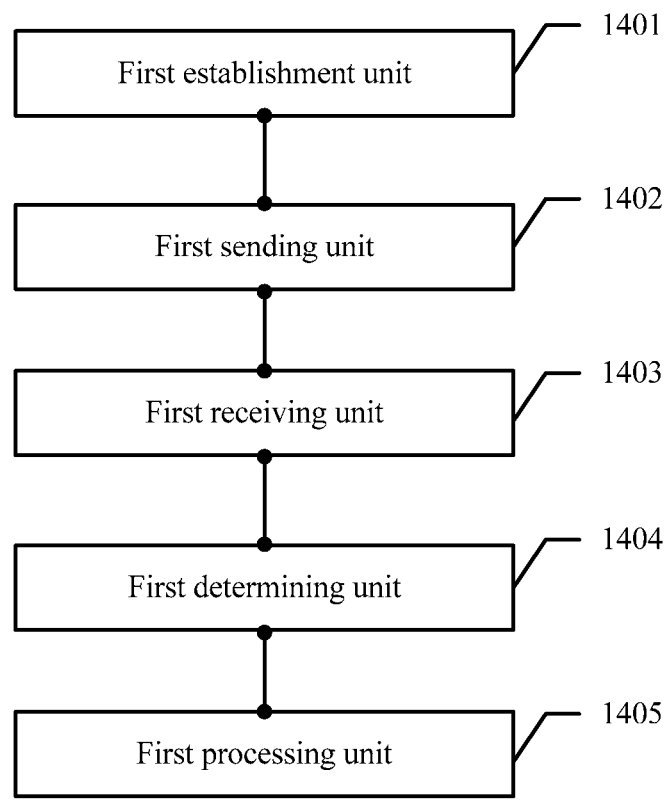
FIG. 14 is a schematic structural diagram of another embodiment of a base station according to the embodiments of the present invention.
Figure 15:
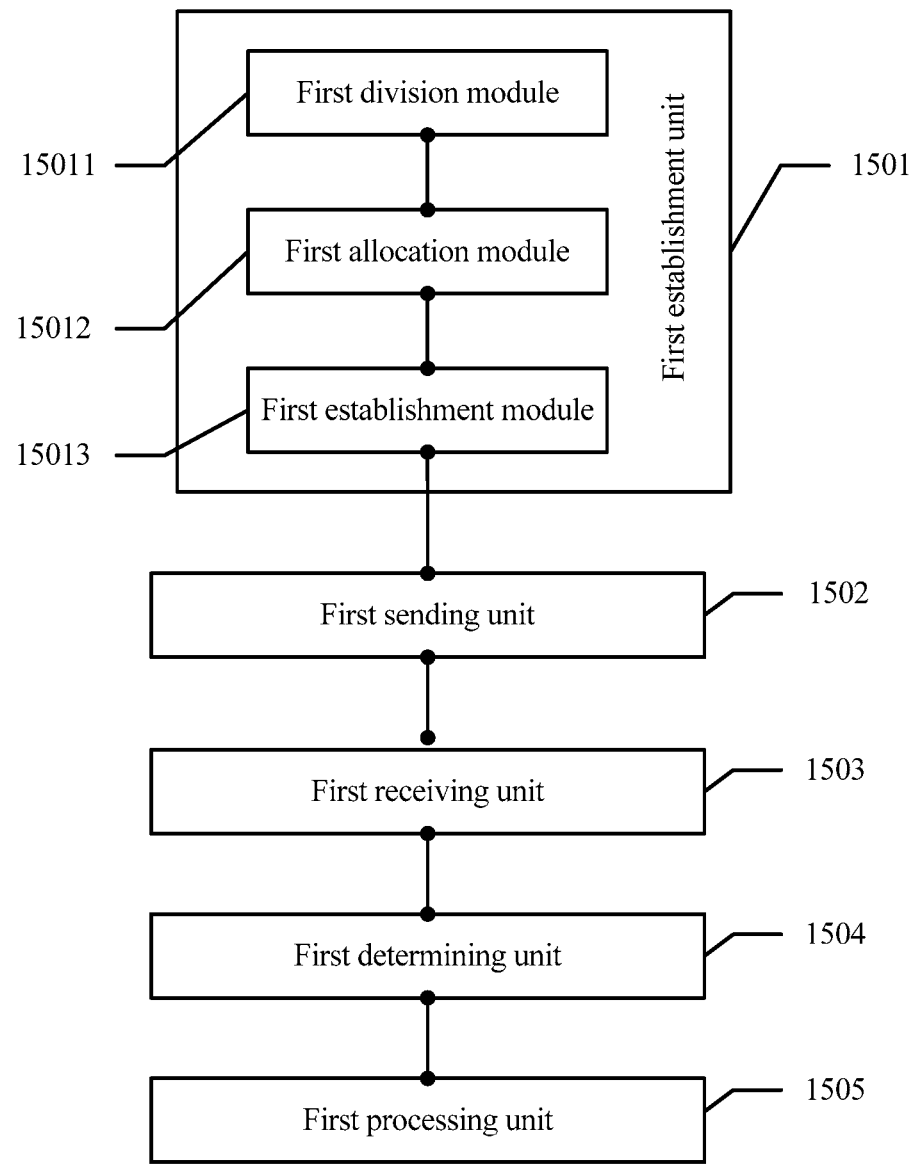
FIG. 15 is a schematic structural diagram of another embodiment of a base station according to the embodiments of the present invention.

The embodiment shown in FIG. 14 describes the specific structure of the base station that can generate the first mapping relationship. With reference to an embodiment shown in FIG. 15, the following describes a specific structure of a base station that can reduce decoding complexity.

In this embodiment, the base station includes a first establishment unit 1501, a first sending unit 1502, a first receiving unit 1503, a first determining unit 1504, and a first processing unit 1505.

The first establishment unit 1501 is configured to establish the first mapping relationship.

The first establishment unit 1501 includes:

a first division module 15011, configured to divide a channel into multiple sub-channels, where the sub-channels are mutually orthogonal;

a first allocation module 15012, configured to separately allocate an uplink sending parameter set to the sub-channels; and a first establishment module 15013, configured to establish the first mapping relationship according to the uplink sending parameter set, where the first mapping relationship is used to indicate a correspondence between a sequence and the uplink sending parameter in the uplink sending parameter set.

The first sending unit 1502 is configured to send the first mapping relationship to the user equipment, so that the user equipment selects an uplink sending parameter according to current channel quality and determines, according to the first mapping relationship, a first target sequence corresponding to the selected uplink sending parameter.

The first receiving unit 1503 is further configured to receive the first target sequence and the uplink data that are sent by the user equipment by using a target sub-channel.

The first determining unit 1504 is further configured to: determine the target uplink sending parameter set according to the target sub-channel, and determine, from the target uplink sending parameter set according to the first mapping relationship, a first target uplink sending parameter corresponding to the first target sequence.

The first processing unit 1505 is configured to demodulate and decode the uplink data according to the first target uplink sending parameter.

In this embodiment, the first division module 15011 divides the channel into the multiple sub-channels, the first allocation module 15012 separately allocates the uplink sending parameter set to the sub-channels, and the first establishment module 15013 establishes first mapping relationships in uplink sending parameter sets. The first mapping relationship includes the correspondence between a sequence and the uplink sending parameter in the uplink sending parameter set. According to this embodiment, sequences on different sub-channels may be reused, and therefore, a quantity of sequences is reduced, which effectively reduces decoding complexity of the base station, improves decoding precision of the base station, and improves data transmission efficiency.

Figure 16:
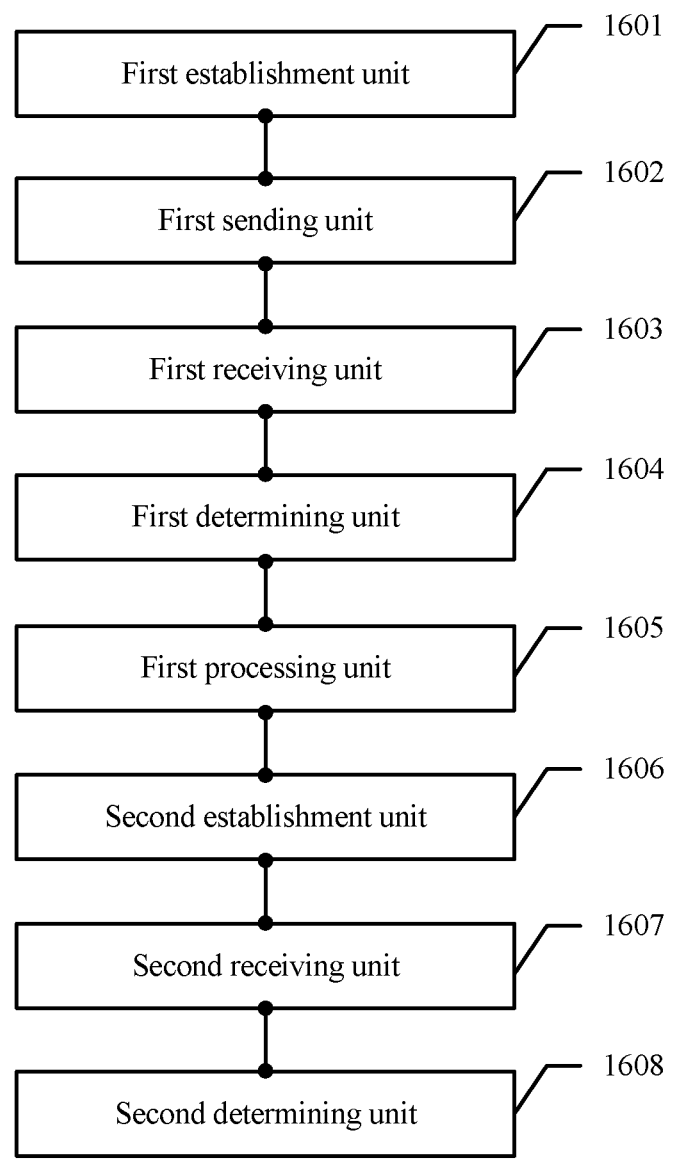
FIG. 16 is a schematic structural diagram of another embodiment of a base station according to the embodiments of the present invention.

The embodiment shown in FIG. 14 describes the specific structure of the base station that can generate the first mapping relationship. With reference to an embodiment shown in FIG. 16, the following describes a specific structure of a base station that can change an uplink data sending manner.

In this embodiment, the base station includes:

a first establishment unit 1601, configured to establish the first mapping relationship;

a first sending unit 1602, configured to send the first mapping relationship to the user equipment, so that the user equipment selects an uplink sending parameter according to current channel quality and determines, according to the first mapping relationship, a first target sequence corresponding to the selected uplink sending parameter;

a first receiving unit 1603, configured to receive uplink data and the first target sequence that are sent by the user equipment;

a first determining unit 1604, configured to determine, according to the first mapping relationship, a first target uplink sending parameter corresponding to the first target sequence, where the first mapping relationship is used to indicate a correspondence between an uplink sending parameter and a sequence;

a first processing unit 1605, configured to demodulate and decode the uplink data according to the first target uplink sending parameter;

a second establishment unit 1606, configured to: establish the second mapping relationship, and send the second mapping relationship to the user equipment;

a second receiving unit 1607, configured to: receive a second target sequence sent by the user equipment, and determine, according to the second mapping relationship, first target channel quality corresponding to the second target sequence, where the second mapping relationship is used to indicate a correspondence between different channel quality and a sequence; and a second determining unit 1608, configured to: determine a downlink sending parameter according to the first target channel quality, and send downlink data and the determined downlink sending parameter to the user equipment, so that the user equipment demodulates and decodes, according to the downlink sending parameter, the downlink data sent by the base station.

In this embodiment, the second establishment unit 1606 may establish the second mapping relationship that is used to indicate the correspondence between different channel quality and a sequence. The second receiving unit 1607 receives the second target sequence sent by the user equipment. The second determining unit 1608 may determine the first target channel quality according to the second target sequence received by the second determining unit 1608. The second determining unit 1608 determines the downlink sending parameter according to the first target channel quality, and sends the determined downlink sending parameter and the downlink data to the user equipment. Therefore, the base station only needs to receive the second target sequence sent by the user equipment, without detecting channel quality, to determine the first target channel quality. In addition, when a size of the uplink data is relatively large, the base station may notify the user equipment that the user equipment does not need to further send the first target sequence, which improves data transmission efficiency.

Figure 17:
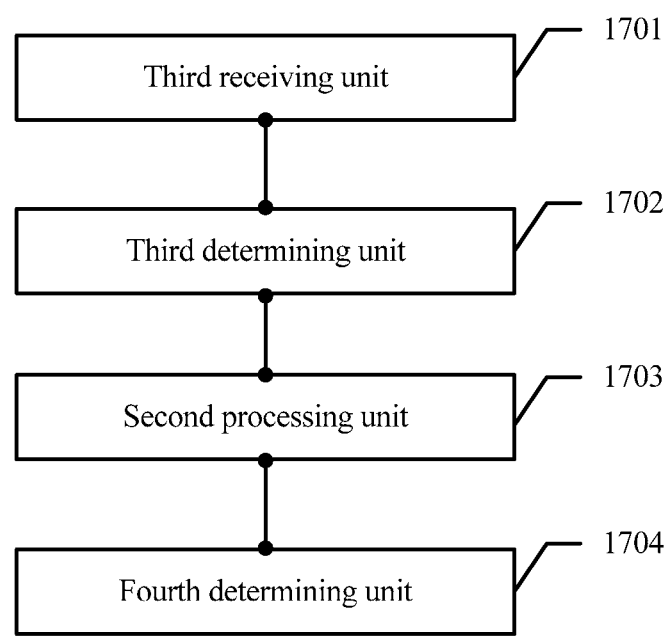
FIG. 17 is a schematic structural diagram of an embodiment of a base station according to the embodiments of the present invention.

With reference to an embodiment shown in FIG. 17, the following describes a specific structure of a base station that can further improve data transmission efficiency.

In this embodiment, the base station includes:

a third receiving unit 1701, configured to receive a third target sequence and uplink data that are sent by user equipment;

a third determining unit 1702, configured to determine, according to a third mapping relationship, a second target uplink sending parameter and second target channel quality that are corresponding to the third target sequence, where the third mapping relationship is used to indicate a correspondence between a sequence and each of an uplink sending parameter and channel quality;

a second processing unit 1703, configured to demodulate and decode the uplink data according to the second target uplink sending parameter; and a fourth determining unit 1704, configured to: determine a downlink sending parameter according to the second target channel quality, and send downlink data and the determined downlink sending parameter to the user equipment, so that the user equipment demodulates and decodes, according to the downlink sending parameter, the downlink data sent by the base station.

In this embodiment, the third receiving unit 1701 receives the third target sequence that is determined by the user equipment according to current channel quality. The third determining unit 1702 may demodulate and decode the uplink data according to the third target sequence and may further determine the current channel quality according to the third target sequence. The fourth determining unit 1704 determines the downlink sending parameter according to the current channel quality. In this embodiment, the base station may determine an uplink sending parameter and the current channel quality by using the third target sequence, without selecting an uplink sending parameter according to channel quality. The base station may determine the uplink sending parameter and the current channel quality without sending a sounding signal, so that network overheads are low and efficiency is high.

The embodiment shown in FIG. 17 describes the specific structure of the base station that can further improve data transmission efficiency. With reference to an embodiment shown in FIG. 18, the following describes a specific structure of a base station that can generate the third mapping relationship.

In this embodiment, the base station includes:

a third establishment unit 1801, configured to establish the third mapping relationship;

a second sending unit 1802, configured to send the third mapping relationship to the user equipment, so that the user equipment selects an uplink sending parameter according to current channel quality determined by the user equipment, and determines, according to the third mapping relationship, a third target sequence corresponding to the selected uplink sending parameter;

a third receiving unit 1803, configured to receive uplink data and the third target sequence that are sent by the user equipment;

a third determining unit 1804, configured to determine, according to the third mapping relationship, a second target uplink sending parameter and second target channel quality that are corresponding to the third target sequence, where the third mapping relationship is used to indicate a correspondence between a sequence and each of an uplink sending parameter and channel quality;

a second processing unit 1805, configured to demodulate and decode the uplink data according to the second target uplink sending parameter; and a fourth determining unit 1806, configured to: determine a downlink sending parameter according to the second target channel quality, and send downlink data and the determined downlink sending parameter to the user equipment, so that the user equipment demodulates and decodes, according to the downlink sending parameter, the downlink data sent by the base station.

In this embodiment, the third establishment unit 1801 may establish the third mapping relationship that is used to indicate the correspondence between a sequence and each of an uplink sending parameter and channel quality. The third receiving unit 1803 receives the third target sequence sent by the user equipment. The third determining unit 1804 may determine, according to the third mapping relationship, the second target uplink sending parameter and the second target channel quality that are corresponding to the third target sequence. Then the second processing unit 1805 demodulates and decodes the uplink data according to the second target uplink sending parameter. The fourth determining unit 1806 determines the downlink sending parameter according to the second target channel quality. In this embodiment, the base station may determine the second target uplink sending parameter and the second target channel quality according to the third mapping relationship established by the base station. Therefore, data transmission efficiency is effectively improved, and in a data transmission process, network overheads are low and data transmission efficiency is improved.

Figure 18:
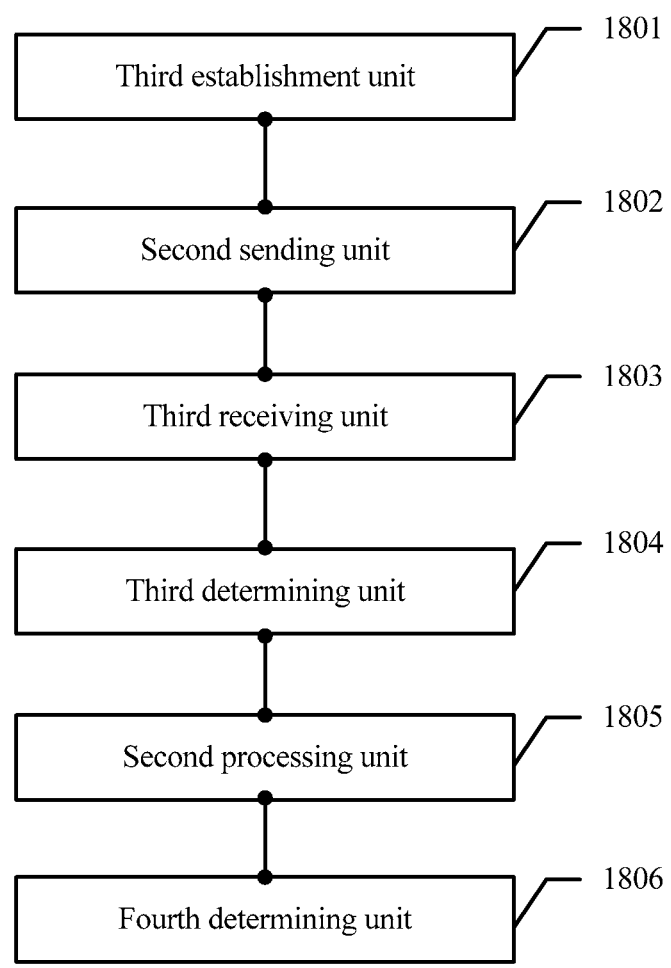
FIG. 18 is a schematic structural diagram of another embodiment of a base station according to the embodiments of the present invention.

The embodiment shown in FIG. 18 describes the specific structure of the base station that can generate the third mapping relationship. With reference to an embodiment shown in FIG. 19, the following describes a specific structure of a base station that can further reduce decoding complexity of the base station.

In this embodiment, the base station includes a third establishment unit 1901, a second sending unit 1902, a third receiving unit 1903, a third determining unit 1904, a second processing unit 1905, and a fourth determining unit 1906.

The third establishment unit 1901 is configured to establish the third mapping relationship.

The third establishment unit 1901 specifically includes:

a second division module 19011, configured to divide a channel into multiple sub-channels, where the sub-channels are mutually orthogonal;

a second allocation module 19012, configured to separately allocate an uplink sending parameter set to the sub-channels; and a second establishment module 19013, configured to establish the third mapping relationship according to the uplink sending parameter set, where the third mapping relationship is used to indicate a correspondence between a sequence and each of channel quality and the uplink sending parameter in the uplink sending parameter set.

The second sending unit 1902 is configured to send the third mapping relationship to the user equipment, so that the user equipment selects an uplink sending parameter according to current channel quality determined by the user equipment, and determines, according to the third mapping relationship, a third target sequence corresponding to the selected uplink sending parameter.

The third receiving unit 1903 is configured to receive the third target sequence and the uplink data that are sent by the user equipment by using a target sub-channel.

The third determining unit 1904 is configured to: determine the target uplink sending parameter set according to the target sub-channel, and determine, from the target uplink sending parameter set according to the third mapping relationship, a second target uplink sending parameter and second target channel quality that are corresponding to the third target sequence.

The second processing unit 1905 is configured to demodulate and decode the uplink data according to the second target uplink sending parameter.

The fourth determining unit 1906 is configured to: determine a downlink sending parameter according to the second target channel quality, and send downlink data and the determined downlink sending parameter to the user equipment, so that the user equipment demodulates and decodes, according to the downlink sending parameter, the downlink data sent by the base station.

In this embodiment, the second division module 19011 divides the channel into the multiple sub-channels, the second allocation module 19012 separately allocates the uplink sending parameter set to the sub-channels, and the second establishment module 19013 establishes third mapping relationships in uplink sending parameter sets. The third mapping relationship indicates the correspondence between a sequence and each of channel quality and the uplink sending parameter in the uplink sending parameter set. According to this embodiment, sequences on different sub-channels may be reused, which effectively reduces a quantity of sequences, and effectively reduces decoding complexity of the base station. In addition, the base station may determine the current channel quality according to the third target sequence, without detecting the current channel quality, which improves data transmission efficiency.

Figure 20:
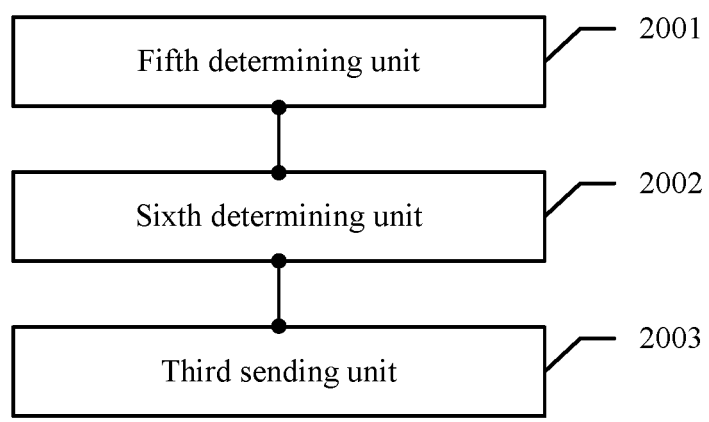
FIG. 20 is a schematic structural diagram of an embodiment of user equipment according to the embodiments of the present invention.

With reference to an embodiment shown in FIG. 20, the following describes a specific structure of user equipment that can implement data transmission.

In this embodiment, the user equipment includes:

a fifth determining unit 2001, configured to: determine current channel quality, and select an uplink sending parameter according to the current channel quality;

a sixth determining unit 2002, configured to determine, according to a first mapping relationship, a first target sequence corresponding to the selected uplink sending parameter, where the first mapping relationship is used to indicate a correspondence between the uplink sending parameter and a sequence; and a third sending unit 2003, configured to send uplink data and the first target sequence to the base station, so that the base station determines, according to the first mapping relationship, a first target uplink sending parameter corresponding to the first target sequence and demodulates and decodes the uplink data according to the first target uplink sending parameter.

In this embodiment, the fifth determining unit 2001 determines the current channel quality, and selects the uplink sending parameter according to the current channel quality. The sixth determining unit 2002 determines, according to the first mapping relationship, the first target sequence corresponding to the uplink sending parameter. The third sending unit 2003 sends the first target sequence to the base station, so that the base station can determine, according to the first target sequence, the uplink sending parameter for sending the uplink data by the user equipment. According to this embodiment of the present invention, the uplink sending parameter does not need to be determined by sending a sounding reference signal by the base station, but is selected by the user equipment. Therefore, if the user equipment sends a relatively small amount of data, the user equipment can notify the base station of an uplink sending parameter used to send the uplink data, which effectively reduces network overheads and improves data transmission efficiency.

The embodiment shown in FIG. 20 describes the specific structure of the user equipment that can implement data transmission. With reference to an embodiment shown in FIG. 21, the following describes a specific structure of user equipment that can change a sending manner.

In this embodiment, the user equipment specifically includes:

a fourth receiving unit 2101, configured to receive the first mapping relationship sent by the base station;

a fifth determining unit 2102, configured to: determine current channel quality, and select an uplink sending parameter according to the current channel quality;

a sixth determining unit 2103, configured to determine, according to the first mapping relationship, a first target sequence corresponding to the selected uplink sending parameter, where the first mapping relationship is used to indicate a correspondence between the uplink sending parameter and a sequence;

a third sending unit 2104, configured to send uplink data and the first target sequence to the base station, so that the base station determines, according to the first mapping relationship, a first target uplink sending parameter corresponding to the first target sequence and demodulates and decodes the uplink data according to the first target uplink sending parameter;

a fourth receiving unit 2105, configured to receive a second mapping relationship sent by the base station, where the second mapping relationship is used to indicate a correspondence between different channel quality and a sequence;

a seventh determining unit 2106, configured to determine, according to the second mapping relationship, a second target sequence corresponding to the current channel quality;

a fourth sending unit 2107, configured to send the second target sequence to the base station, so that the base station determines, according to the second mapping relationship, first target channel quality corresponding to the second target sequence, determines a downlink sending parameter according to the first target channel quality, and sends downlink data and the determined downlink sending parameter to the user equipment; and a third processing unit 2108, configured to demodulate and decode the downlink data according to the downlink sending parameter.

In this embodiment, the fourth receiving unit 2105 receives the second mapping relationship sent by the base station. The seventh determining unit 2106 determines, according to the second mapping relationship received by the user equipment, the second target sequence corresponding to the current channel quality. The fourth sending unit 2107 sends the second target sequence to the base station, so that the base station determines the current channel quality according to the second target sequence and sends the downlink data and the downlink sending parameter. The third processing unit 2108 demodulates and decodes the downlink data according to the downlink sending parameter. In this embodiment, if the user equipment sends a relatively large amount of uplink data and sending of the relatively large amount of uplink data cannot be completed at a time, the user equipment may determine, according to the downlink data sent by the base station, that when subsequently sending uplink data, the user equipment does not need to re-determine a sequence, but sends the uplink data directly by using the selected uplink sending parameter, which improves data transmission efficiency.

The embodiment shown in FIG. 20 describes the specific structure of the user equipment that can implement data transmission. With reference to an embodiment shown in FIG. 22, the following describes a specific structure of user equipment that can send uplink data by using a sub-channel.

In this embodiment, the user equipment includes a fourth receiving unit 2201, a fifth determining unit 2202, a sixth determining unit 2203, a third sending unit 2204, a fourth receiving unit 2205, a seventh determining unit 2206, a fourth sending unit 2207, and a third processing unit 2208.

The fourth receiving unit 2201 is configured to receive the first mapping relationship sent by the base station.

The fifth determining unit 2202 is configured to: determine current channel quality, and select an uplink sending parameter according to the current channel quality.

The fifth determining unit 2202 specifically includes:

a first determining module 22021, configured to determine a target uplink sending parameter set according to the selected uplink sending parameter, where the selected uplink sending parameter belongs to the target uplink sending parameter set, the first mapping relationship is used to indicate a correspondence between a sequence and the uplink sending parameter in an uplink sending parameter set, the uplink sending parameter set is separately allocated by the base station to sub-channels, the sub-channels are determined by the base station by dividing a channel, and the sub-channels are mutually orthogonal; and a second determining module 22022, configured to determine a target sub-channel according to the target uplink sending parameter set, where the target sub-channel is corresponding to the target uplink sending parameter set.

The sixth determining unit 2203 is configured to determine, according to the first mapping relationship, a first target sequence corresponding to the selected uplink sending parameter, where the first mapping relationship is used to indicate a correspondence between the uplink sending parameter and a sequence.

The third sending unit 2204 is further configured to send the first target sequence and the uplink data to the base station by using the target sub-channel, so that the base station determines the target uplink sending parameter set according to the target sub-channel and determines, from the target uplink sending parameter set according to the first mapping relationship, a first target uplink sending parameter corresponding to the first target sequence.

In this embodiment, the fourth receiving unit 2201 receives the first mapping relationship sent by the base station, where the first mapping relationship is used to indicate the correspondence between a sequence and the uplink sending parameter in the uplink sending parameter set. The first determining module 22021 determines the current channel quality, selects the uplink sending parameter according to the current channel quality, and determines the target sub-channel and the first target sequence. The third sending unit 2204 sends the first target sequence to the base station by using the target sub-channel. In this embodiment, sequences on different sub-channels may be reused. Therefore, a quantity of sequences is reduced, and decoding complexity of the base station is reduced. In addition, because a relatively small quantity of uplink sending parameters is in the first mapping relationship on the sub-channel, the user equipment can quickly determine a sequence corresponding to the uplink sending parameter, which effectively improves data transmission efficiency.

Figure 23:
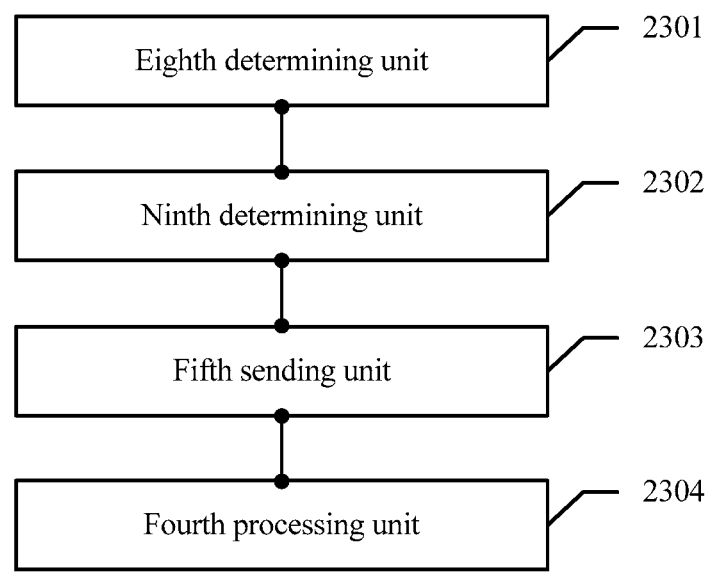
FIG. 23 is a schematic structural diagram of an embodiment of user equipment according to the embodiments of the present invention.

With reference to an embodiment shown in FIG. 23, the following describes a specific structure of user equipment that can reduce a quantity of sequence sending times in a data transmission process.

In this embodiment, the user equipment specifically includes:

an eighth determining unit 2301, configured to: determine current channel quality, and select the uplink sending parameter according to the current channel quality;

a ninth determining unit 2302, configured to determine, according to a third mapping relationship, a third target sequence corresponding to the selected uplink sending parameter, where the third mapping relationship is used to indicate a correspondence between a sequence and each of an uplink sending parameter and channel quality;

a fifth sending unit 2303, configured to send the third target sequence and the uplink data to the base station, so that the base station determines, according to the third mapping relationship, a second target uplink sending parameter and second target channel quality that are corresponding to the third target sequence, and the base station demodulates and decodes the uplink data according to the second target uplink sending parameter, determines a downlink sending parameter according to the second target channel quality, and sends downlink data and the determined downlink sending parameter to the user equipment; and a fourth processing unit 2304, configured to demodulate and decode, according to the downlink sending parameter, the downlink data sent by the base station.

In this embodiment, the eighth determining unit 2301 determines the current channel quality, and selects the uplink sending parameter according to the current channel quality. The fifth sending unit 2303 sends the third target sequence and the uplink data to the base station and receives the downlink data sent by the base station. In this embodiment, the base station may determine the uplink sending parameter and the current channel quality according to the third target sequence, provided that the user equipment sends the third target sequence to the base station. In this case, if the user equipment sends a relatively large amount of uplink data and sending of the relatively large amount of uplink data cannot be completed at a time, the user equipment does not need to re-send a sequence that is used for determining current channel quality, which improves data transmission efficiency.

The embodiment shown in FIG. 23 describes the specific structure of the user equipment that can reduce a quantity of sequence sending times in a data transmission process. With reference to an embodiment shown in FIG. 24, the following describes a specific structure of user equipment that can improve a speed of determining the third target sequence by the user equipment.

In this embodiment, the user equipment specifically includes a fifth receiving unit 2401, an eighth determining unit 2402, a ninth determining unit 2403, a fifth sending unit 2404, and a fourth processing unit 2405.

The fifth receiving unit 2401 is configured to receive the third mapping relationship sent by the base station.

The eighth determining unit 2402 is configured to: determine current channel quality, and select the uplink sending parameter according to the current channel quality.

The eighth determining unit 2402 specifically includes:

a third determining module 24021, configured to determine a target uplink sending parameter set according to the selected uplink sending parameter, where the selected uplink sending parameter belongs to the target uplink sending parameter set, the third mapping relationship is used to indicate a correspondence between a sequence and each of channel quality and the uplink sending parameter in an uplink sending parameter set, the uplink sending parameter set is separately allocated by the base station to sub-channels, the sub-channels are determined by the base station by dividing a channel, and the sub-channels are mutually orthogonal; and a fourth determining module 24022, configured to determine a target sub-channel according to the target uplink sending parameter set, where the target sub-channel is corresponding to the target uplink sending parameter set.

The ninth determining unit 2403 is configured to determine, according to the third mapping relationship, a third target sequence corresponding to the selected uplink sending parameter, where the third mapping relationship is used to indicate a correspondence between a sequence and each of an uplink sending parameter and channel quality.

The fifth sending unit 2404 is further configured to send the third target sequence and the uplink data to the base station by using the target sub-channel, so that the base station determines the target uplink sending parameter set according to the target sub-channel and determines, from the target uplink sending parameter set according to the third mapping relationship, a second target uplink sending parameter and second target channel quality that are corresponding to the third target sequence.

The fourth processing unit 2405 is configured to demodulate and decode, according to the downlink sending parameter, downlink data sent by the base station.

In this embodiment, the fifth receiving unit 2401 receives the third mapping relationship sent by the base station, where the third mapping relationship is used to indicate the correspondence between a sequence and each of channel quality and the uplink sending parameter in the uplink sending parameter set. The eighth determining unit 2402 determines the current channel quality and selects the uplink sending parameter according to the current channel quality. The third determining module 24021 determines the target uplink sending parameter set according to the selected uplink sending parameter. The fourth determining module 24022 determines the target sub-channel according to the target uplink sending parameter set. The ninth determining unit 2403 determines, according to the third mapping relationship, the third target sequence corresponding to the selected uplink sending parameter, so that the base station determines the second target channel quality according to the third target sequence. According to this embodiment, the base station may determine the second target channel quality provided that the user equipment sends the third target sequence to the base station, which reduces a quantity of sequence sending times and improves data transmission efficiency.

The foregoing embodiments describe structures of a base station and user equipment in detail. To better understand the embodiments of the present invention, the following further describes in detail the embodiments of the present invention by using specific application scenarios.

A first establishment unit 1501 of the base station predetermines an uplink sending parameter that may be used by user equipment to send uplink data.

The uplink sending parameter is an uplink data decoding scheme, a modulation scheme, uplink data transmit power, a quantity of repetition times, and the like.

A first division module 15011 of the base station divides a channel into N (where N is greater than 1) sub-channels.

Different quantities of repetition times may be used for the sub-channels. For example, a sub-channel 1 is repeatedly used for eight times, a sub-channel 2 is repeatedly used for 64 times, and a sub-channel 3 is not repeatedly used.

A first allocation module 15012 of the base station separately allocates an uplink sending parameter set to the sub-channels.

The uplink sending parameter set includes M (where M is greater than or equal to 0) uplink sending parameters.

A first establishment module 15013 of the base station allocates a sequence to uplink sending parameters in each uplink sending parameter set.

Sequences in an uplink sending parameter set are different from each other, but sequences in different uplink sending parameter sets may be the same.

The first establishment module 15013 of the base station establishes the first mapping relationship according to the uplink sending parameter set, where the first mapping relationship is used to indicate a correspondence between different sequences and different uplink sending parameters in the uplink sending parameter set.

A first sending unit 1502 of the base station notifies the user equipment of the first mapping relationship by means of system broadcast.

A fourth receiving unit 2201 of the user equipment receives the first mapping relationship.

The fifth determining unit 2202 determines current channel quality when the user equipment sends the uplink data. The current channel quality includes a signal to interference plus noise ratio, a bit error rate, or a symbol error rate.

In this application scenario, the signal to interference plus noise ratio is used as an example.

That is, the fifth determining unit 2202 of the user equipment determines a signal to interference plus noise ratio of a current channel.

The fifth determining unit 2202 of the user equipment selects an uplink sending parameter according to the signal to interference plus noise ratio (SINR).

The base station may notify, by means of system broadcast, the user equipment of a manner of selecting the corresponding uplink sending parameter according to the SINR.

In this application scenario, when the base station notifies the user equipment that if SINR<a1, the user equipment determines that the uplink sending parameter is S1; if a1≤SINR<a2, the user equipment determines that the uplink sending parameter is S2; and if SINR≥am, the user equipment determines that the uplink sending parameter is S3.

The fifth determining unit 2202 of the user equipment determines that the current SINR≥am, and therefore, determines that the used uplink sending parameter is S3.

A first determining module 22021 of the user equipment determines, according to the selected uplink sending parameter, a target uplink sending parameter set to which S3 belongs.

A second determining module 22022 of the user equipment determines a first mapping relationship corresponding to the target uplink sending parameter set.

The second determining module 22022 of the user equipment determines a target sub-channel according to the target uplink sending parameter set.

For the first mapping relationship determined by the second determining module 22022 of the user equipment, reference may be made to Table 1.

TABLE 1

| Sequence | Uplink sending parameter |
|---|---|
| 1 | S1 |
| 2 | S2 |
| 3 | S3 |

A sixth determining unit 2203 of the user equipment determines, according to the first mapping relationship, a first target sequence corresponding to the selected uplink sending parameter.

In this application scenario, the sixth determining unit 2203 of the user equipment determines that the first target sequence corresponding to the uplink sending parameter S3 is 3.

A third sending unit 2204 of the user equipment sends the sequence 3 and the uplink data to the base station by using the target sub-channel.

A first receiving unit 1503 of the base station receives, by using the target sub-channel, the sequence 3 and the uplink data that are sent by the user equipment.

A first determining unit 1504 of the base station determines the target uplink sending parameter set according to the target sub-channel.

The first determining unit 1504 of the base station determines the first mapping relationship established in the target uplink sending parameter set, that is, Table 1.

The first determining unit 1504 of the base station determines, according to the first mapping relationship, a first target uplink sending parameter corresponding to the sequence 3, that is, S3.

A first processing unit 1505 of the base station demodulates and decodes the uplink data according to S3.

If the uplink data received by the first receiving unit 1503 of the base station carries indication information that is used to indicate a size of uplink data, the base station determines, according to the indication information, that the user equipment needs to continue to send uplink data.

A second establishment unit 1606 of the base station establishes a second mapping relationship. The second mapping relationship is used to indicate a correspondence between different channel quality and a sequence.

For the second mapping relationship, refer to Table 2.

TABLE 2

| Sequence | Channel quality |
|---|---|
| 5 | SINR < a1 |
| 6 | a1 ≤ SINR < a2 |
| 7 | SINR ≥ am |

The second establishment unit 1606 of the base station sends the second mapping relationship to the user equipment.

A seventh determining unit 2106 of the user equipment determines, according to the second mapping relationship, a second target sequence corresponding to the current channel quality.

In this application scenario, the seventh determining unit 2106 of the user equipment has determined that the SINR≥am, and therefore, may determine, according to the second mapping relationship, that the second target sequence is 7.

A fourth sending unit 2107 of the user equipment sends the sequence 7 to the base station.

A second receiving unit 1607 of the base station receives the sequence 7, and determines, according to the second mapping relationship, the current channel quality corresponding to the sequence 7, that is, determines that the current channel quality is the SINR≥am.

A second determining unit 1608 of the base station determines a downlink sending parameter according to the SINR≥am, and sends downlink data and the determined downlink sending parameter to the user equipment.

A third processing unit 2108 of the user equipment demodulates and decodes the downlink data according to the downlink sending parameter.

When the downlink data carries notification information that is used to notify the user equipment that when subsequently sending uplink data, the user equipment does not need to re-determine a sequence, when the user equipment continues to send uplink data, the user equipment sends the uplink data directly by using the current selected uplink sending parameter (S3).

Figure 25:
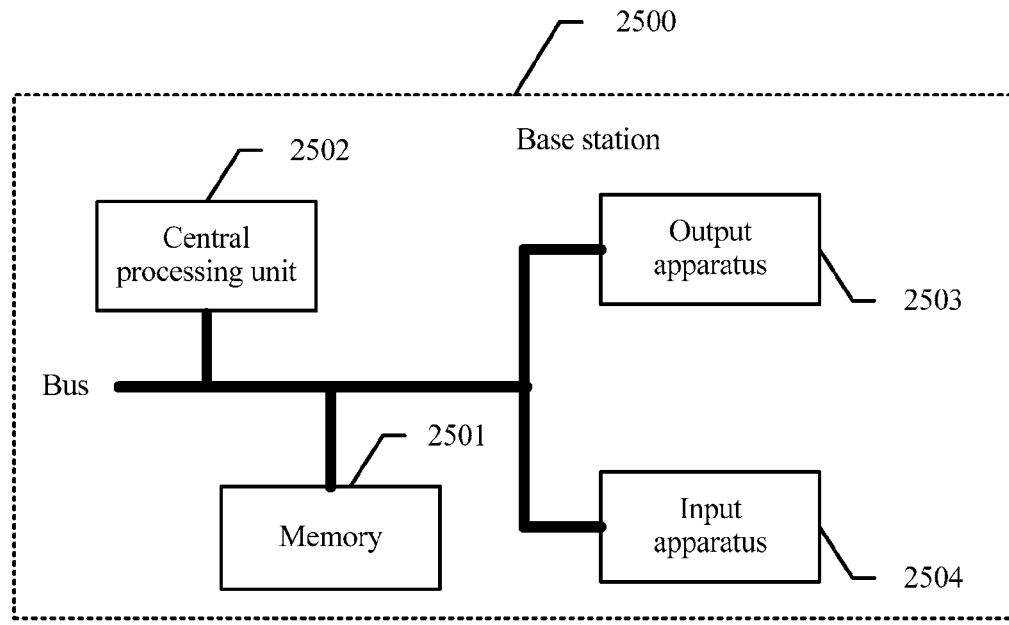
FIG. 25 is a schematic structural diagram of another embodiment of a base station according to the embodiments of the present invention.

The embodiments shown in FIG. 13 to FIG. 16 describe in detail structures of base stations from a perspective of a function module entity. With reference to FIG. 25, the following describes in detail a structure of a base station in an embodiment of the present invention from a perspective of hardware. For details, refer to FIG. 25.

As shown in FIG. 25, the base station 2500 includes a memory 2501, a central processing unit (CPU for short) 2502, an output apparatus 2503, and an input apparatus 2504. There may be one or more central processing units 2502 shown in FIG. 25. In the embodiment shown in FIG. 25, one central processing unit 2502 is used as an example for description.

In some embodiments of the present invention, the central processing unit 2502, the memory 2501, the output apparatus 2503, and the input apparatus 2504 may be connected by using a bus or in another manner. In FIG. 25, connection by using a bus is used as an example.

It should be noted that the base station provided in this embodiment is merely an example of a base station provided in embodiments of the present invention. The base station involved in this embodiment of the present invention may have more or less components than the components shown in FIG. 25, may combine two or more components, or may have different component configurations or settings. Each component may be implemented in hardware that includes one or more signal processing circuits and/or application-specific integrated circuits, software, or a combination of hardware and software.

In this embodiment of the present invention, the central processing unit 2502 is configured to execute the following:

receiving a first target sequence and uplink data that are sent by user equipment;

determining, according to a first mapping relationship, a first target uplink sending parameter corresponding to the first target sequence, where the first mapping relationship is used to indicate a correspondence between an uplink sending parameter and a sequence; and demodulating and decoding the uplink data according to the first target uplink sending parameter.

In other embodiments of the present invention, the central processing unit 2502 is further configured to execute the following:

sending the first mapping relationship to the user equipment, so that the user equipment selects an uplink sending parameter according to current channel quality and determines, according to the first mapping relationship, a first target sequence corresponding to the selected uplink sending parameter.

In other embodiments of the present invention, the central processing unit 2502 is further configured to execute the following:

establishing the first mapping relationship.

In other embodiments of the present invention, the central processing unit 2502 is further configured to execute the following:

dividing a channel into multiple sub-channels, where the sub-channels are mutually orthogonal;

separately allocating an uplink sending parameter set to the sub-channels; and establishing the first mapping relationship according to the uplink sending parameter set, where the first mapping relationship is used to indicate a correspondence between the uplink sending parameter in the uplink sending parameter set and a sequence.

In other embodiments of the present invention, the central processing unit 2502 is further configured to execute the following:

receiving the first target sequence and the uplink data that are sent by the user equipment by using a target sub-channel; and determining the target uplink sending parameter set according to the target sub-channel, and determining, from the target uplink sending parameter set according to the first mapping relationship, the first target uplink sending parameter corresponding to the first target sequence.

In other embodiments of the present invention, the central processing unit 2502 is further configured to execute the following:

receiving a second target sequence sent by the user equipment, and determining, according to a second mapping relationship, first target channel quality corresponding to the second target sequence, where the second mapping relationship is used to indicate a correspondence between different channel quality and a sequence; and determining a downlink sending parameter according to the first target channel quality, and sending downlink data and the determined downlink sending parameter to the user equipment, so that the user equipment demodulates and decodes, according to the downlink sending parameter, the downlink data sent by the base station.

In other embodiments of the present invention, the central processing unit 2502 is further configured to execute the following:

establishing the second mapping relationship, and sending the second mapping relationship to the user equipment.

Figure 19:
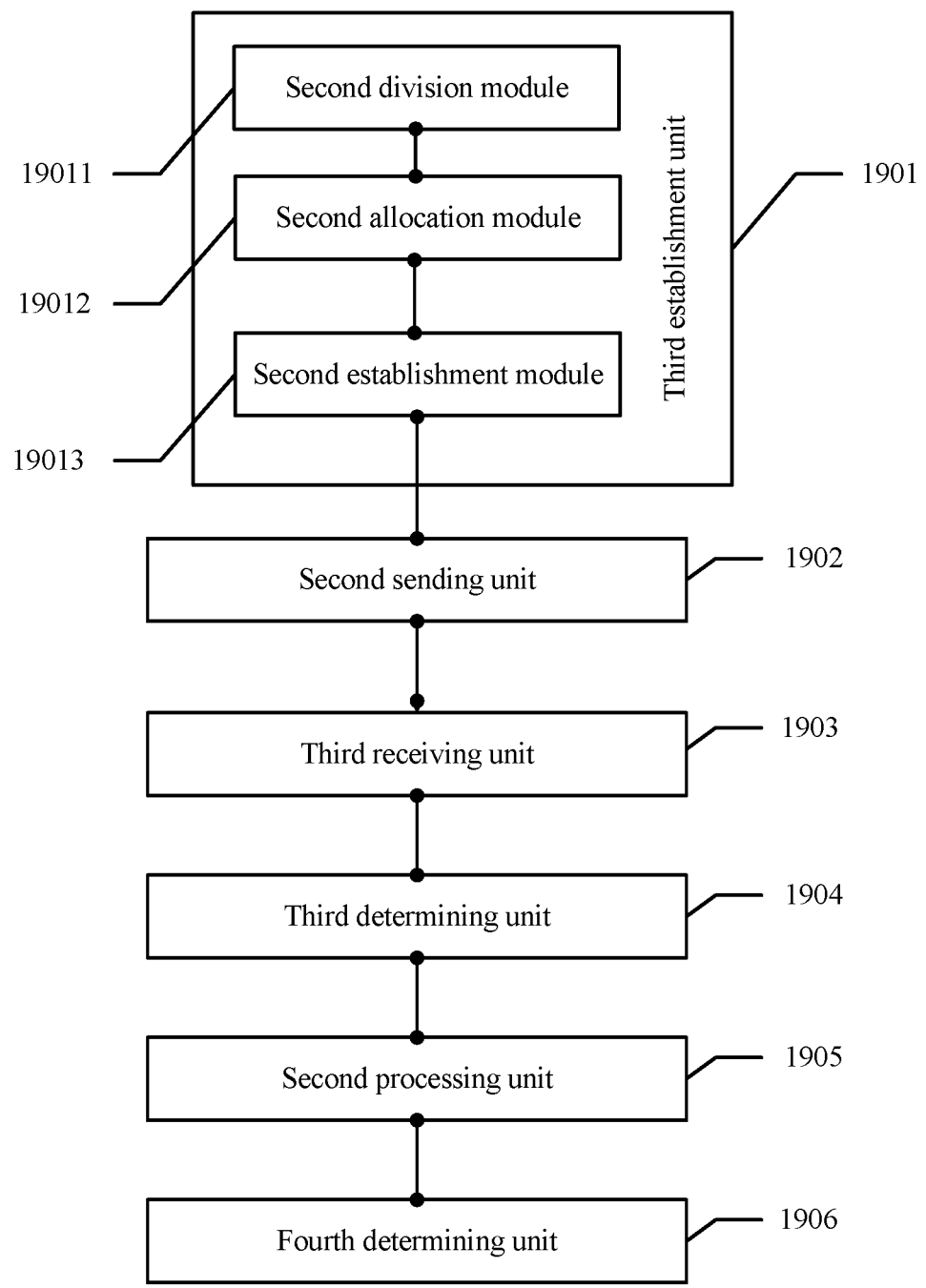
FIG. 19 is a schematic structural diagram of another embodiment of a base station according to the embodiments of the present invention.
Figure 26:
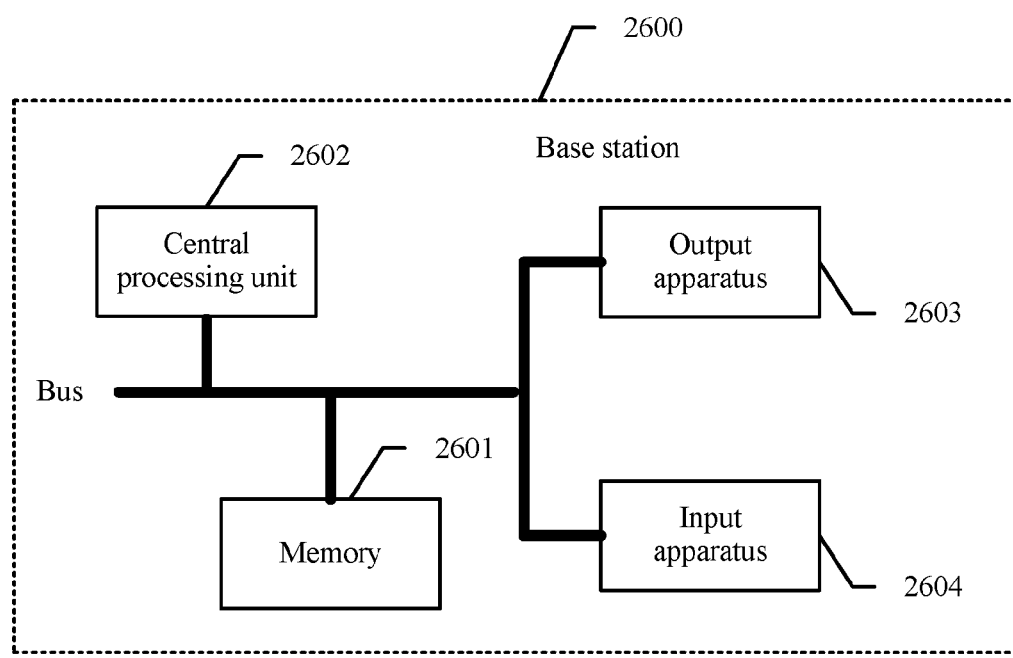
FIG. 26 is a schematic structural diagram of another embodiment of a base station according to the embodiments of the present invention.

The embodiments shown in FIG. 17 to FIG. 19 describe in detail structures of base stations from a perspective of a function module entity. With reference to FIG. 26, the following describes in detail a structure of a base station in an embodiment of the present invention from a perspective of hardware. For details, refer to FIG. 26.

As shown in FIG. 26, the base station 2600 includes a memory 2601, a central processing unit (CPU for short) 2602, an output apparatus 2603, and an input apparatus 2604. There may be one or more central processing units 2602 shown in FIG. 26. In the embodiment shown in FIG. 26, one central processing unit 2602 is used as an example for description.

In some embodiments of the present invention, the central processing unit 2602, the memory 2601, the output apparatus 2603, and the input apparatus 2604 may be connected by using a bus or in another manner. In FIG. 26, connection by using a bus is used as an example.

It should be noted that the base station provided in this embodiment is merely an example of a base station provided in embodiments of the present invention. The base station involved in this embodiment of the present invention may have more or less components than the components shown in FIG. 26, may combine two or more components, or may have different component configurations or settings. Each component may be implemented in hardware that includes one or more signal processing circuits and/or application-specific integrated circuits, software, or a combination of hardware and software.

In this embodiment of the present invention, the central processing unit 2602 is configured to execute the following:

receiving a third target sequence and uplink data that are sent by user equipment;

determining, according to a third mapping relationship, a second target uplink sending parameter and second target channel quality that are corresponding to the third target sequence, where the third mapping relationship is used to indicate a correspondence between a sequence and each of an uplink sending parameter and channel quality;

demodulating and decoding the uplink data according to the second target uplink sending parameter; and determining a downlink sending parameter according to the second target channel quality, and sending downlink data and the determined downlink sending parameter to the user equipment, so that the user equipment demodulates and decodes, according to the downlink sending parameter, the downlink data sent by the base station.

In other embodiments of the present invention, the central processing unit 2602 is further configured to execute the following:

sending the third mapping relationship to the user equipment, so that the user equipment selects an uplink sending parameter according to current channel quality determined by the user equipment, and determines, according to the third mapping relationship, a third target sequence corresponding to the selected uplink sending parameter.

In other embodiments of the present invention, the central processing unit 2602 is further configured to execute the following:

establishing the third mapping relationship.

In other embodiments of the present invention, the central processing unit 2602 is further configured to execute the following:

dividing a channel into multiple sub-channels, where the sub-channels are mutually orthogonal;

separately allocating an uplink sending parameter set to the sub-channels; and establishing the third mapping relationship according to the uplink sending parameter set, where the third mapping relationship is used to indicate a correspondence between a sequence and each of channel quality and the uplink sending parameter in the uplink sending parameter set.

In other embodiments of the present invention, the central processing unit 2602 is further configured to execute the following:

receiving the third target sequence and the uplink data that are sent by the user equipment by using a target sub-channel; and determining the target uplink sending parameter set according to the target sub-channel, and determining, from the target uplink sending parameter set according to the third mapping relationship, the second target uplink sending parameter and the second target channel quality that are corresponding to the third target sequence.

Figure 21:
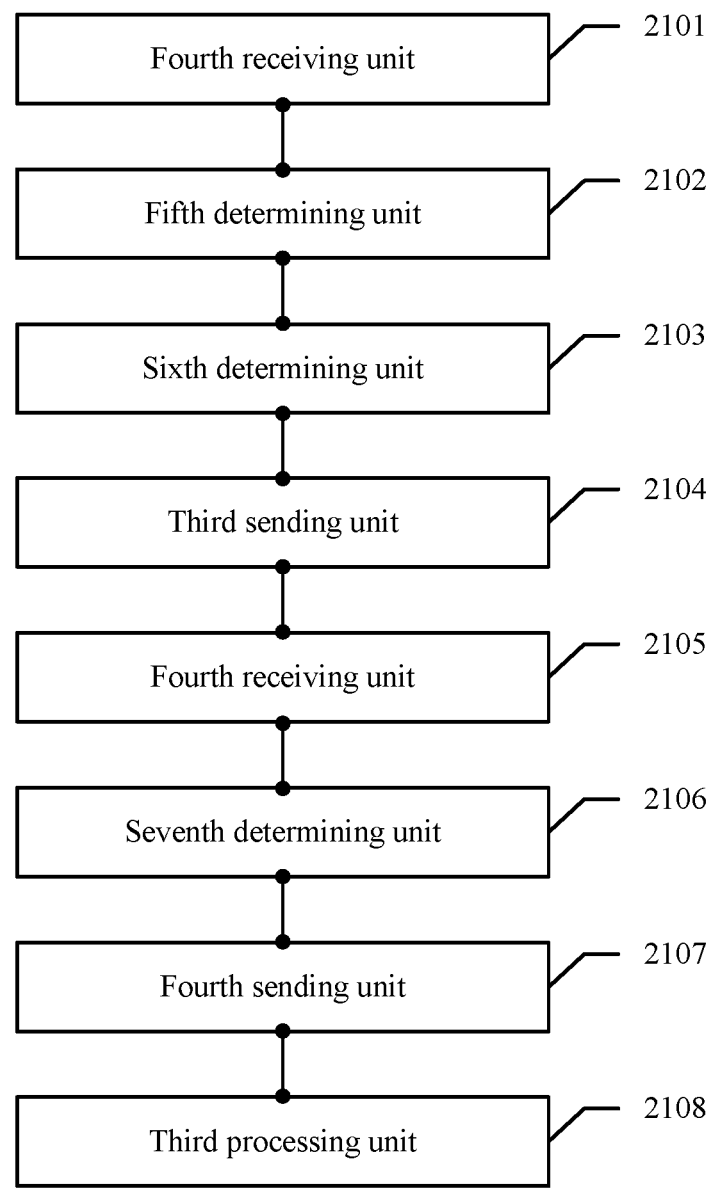
FIG. 21 is a schematic structural diagram of another embodiment of user equipment according to the embodiments of the present invention.
Figure 22:
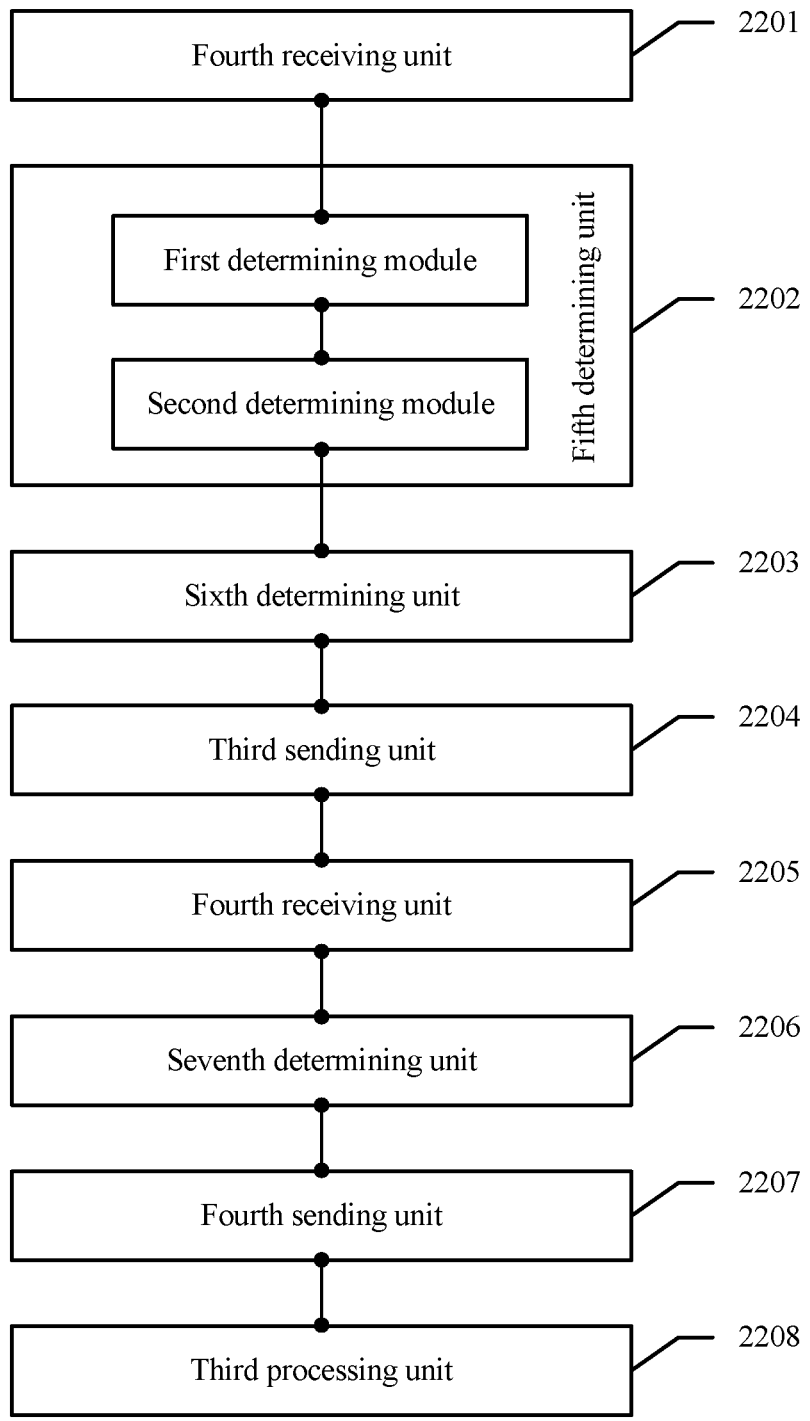
FIG. 22 is a schematic structural diagram of another embodiment of user equipment according to the embodiments of the present invention.
Figure 27:
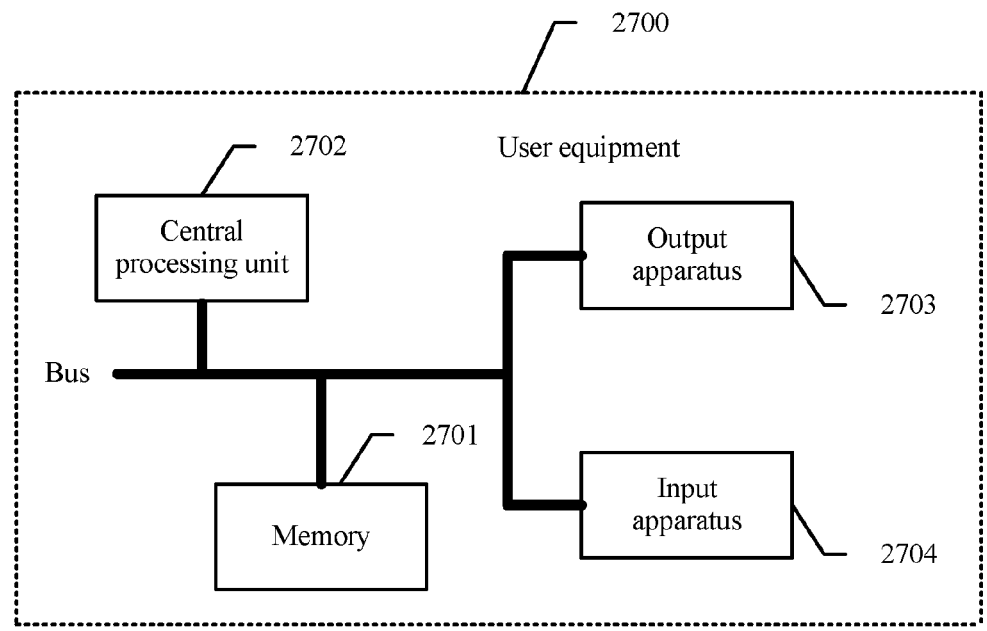
FIG. 27 is a schematic structural diagram of another embodiment of user equipment according to the embodiments of the present invention.

The embodiments shown in FIG. 20 to FIG. 22 describe in detail structures of user equipment from a perspective of a function module entity. With reference to FIG. 27, the following describes in detail a structure of user equipment in an embodiment of the present invention from a perspective of hardware. For details, refer to FIG. 27.

As shown in FIG. 27, the user equipment 2700 includes a memory 2701, a central processing unit (CPU for short) 2702, an output apparatus 2703, and an input apparatus 2704. There may be one or more central processing units 2702 shown in FIG. 27. In the embodiment shown in FIG. 27, one central processing unit 2702 is used as an example for description.

In some embodiments of the present invention, the central processing unit 2702, the memory 2701, the output apparatus 2703, and the input apparatus 2704 may be connected by using a bus or in another manner. In FIG. 27, connection by using a bus is used as an example.

It should be noted that the user equipment provided in this embodiment is merely an example of an user equipment provided in embodiments of the present invention. The user equipment involved in this embodiment of the present invention may have more or less components than the components shown in FIG. 27, may combine two or more components, or may have different component configurations or settings. Each component may be implemented in hardware that includes one or more signal processing circuits and/or application-specific integrated circuits, software, or a combination of hardware and software.

In this embodiment of the present invention, the central processing unit 2702 is configured to execute the following:

determining current channel quality, and selecting an uplink sending parameter according to the current channel quality;

determining, according to a first mapping relationship, a first target sequence corresponding to the selected uplink sending parameter, where the first mapping relationship is used to indicate a correspondence between the uplink sending parameter and a sequence; and sending, uplink data and the first target sequence to the base station, so that the base station determines, according to the first mapping relationship, a first target uplink sending parameter corresponding to the first target sequence and demodulates and decodes the uplink data according to the first target uplink sending parameter.

In other embodiments of the present invention, the central processing unit 2702 is further configured to execute the following:

receiving the first mapping relationship sent by the base station.

In other embodiments of the present invention, the central processing unit 2702 is further configured to execute the following:

determining a target uplink sending parameter set according to the selected uplink sending parameter, where the selected uplink sending parameter belongs to the target uplink sending parameter set, the first mapping relationship is used to indicate a correspondence between a sequence and the uplink sending parameter in an uplink sending parameter set, the uplink sending parameter set is separately allocated by the base station to sub-channels, the sub-channels are determined by the base station by dividing a channel, and the sub-channels are mutually orthogonal;

determining a target sub-channel according to the target uplink sending parameter set, where the target sub-channel is corresponding to the target uplink sending parameter set; and sending the first target sequence and the uplink data to the base station by using the target sub-channel, so that the base station determines the target uplink sending parameter set according to the target sub-channel and determines, from the target uplink sending parameter set according to the first mapping relationship, the first target uplink sending parameter corresponding to the first target sequence.

In other embodiments of the present invention, the central processing unit 2702 is further configured to execute the following:

receiving a second mapping relationship sent by the base station, where the second mapping relationship is used to indicate a correspondence between different channel quality and a sequence;

determining, according to the second mapping relationship, a second target sequence corresponding to the current channel quality;

sending the second target sequence to the base station, so that the base station determines, according to the second mapping relationship, first target channel quality corresponding to the second target sequence, determines a downlink sending parameter according to the first target channel quality, and sends downlink data and the determined downlink sending parameter to the user equipment; and demodulating and decoding the downlink data according to the downlink sending parameter.

Figure 24:
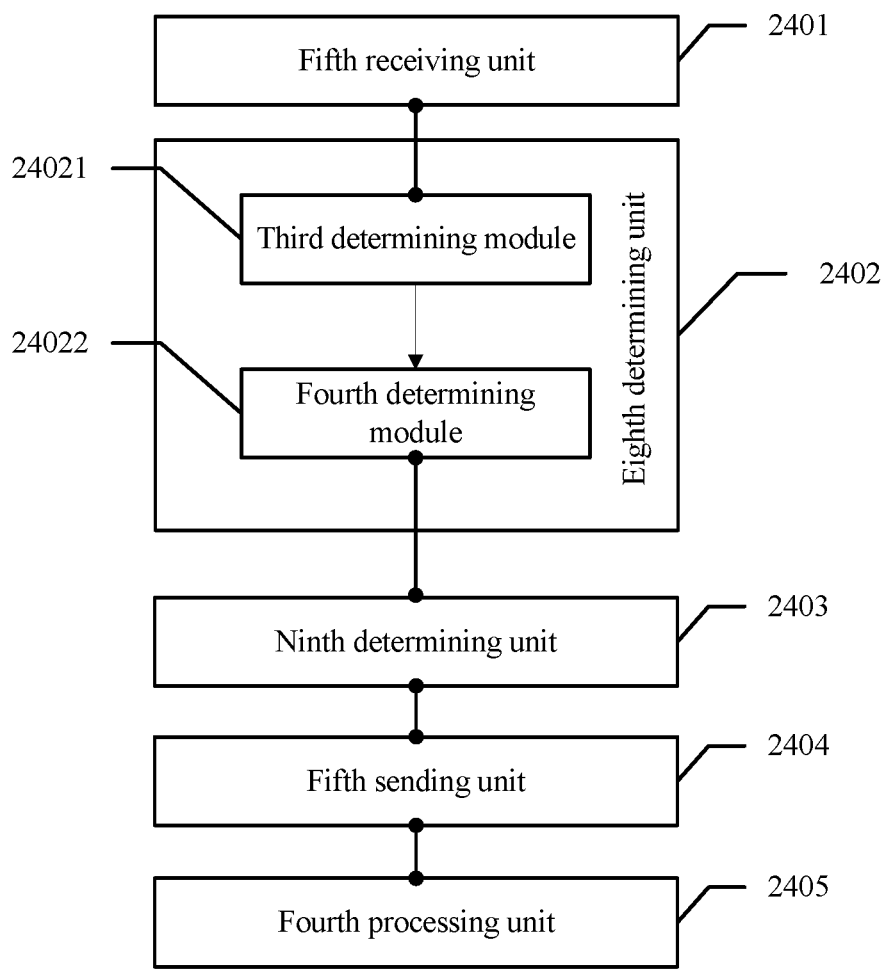
FIG. 24 is a schematic structural diagram of another embodiment of user equipment according to the embodiments of the present invention.
Figure 28:
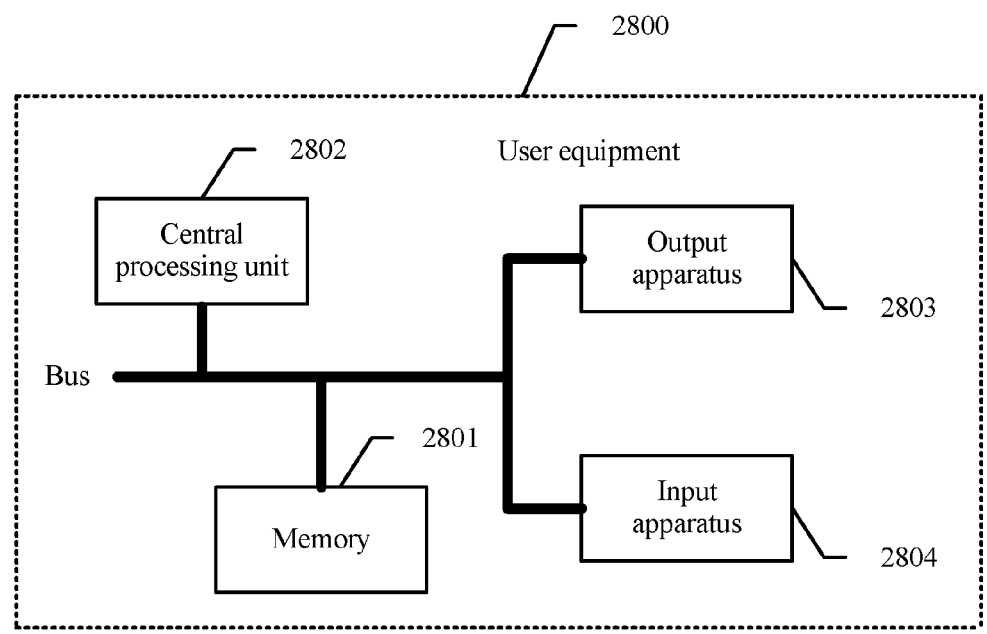
FIG. 28 is a schematic structural diagram of another embodiment of user equipment according to the embodiments of the present invention.

The embodiments shown in FIG. 23 to FIG. 24 describe in detail structures of user equipment from a perspective of a function module entity. With reference to FIG. 28, the following describes in detail a structure of user equipment in an embodiment of the present invention from a perspective of hardware. For details, refer to FIG. 28.

As shown in FIG. 28, the user equipment 2800 includes a memory 2801, a central processing unit (CPU for short) 2802, an output apparatus 2803, and an input apparatus 2804. There may be one or more central processing units 2802 shown in FIG. 28. In the embodiment shown in FIG. 28, one central processing unit 2802 is used as an example for description.

In some embodiments of the present invention, the central processing unit 2802, the memory 2801, the output apparatus 2803, and the input apparatus 2804 may be connected by using a bus or in another manner. In FIG. 28, connection by using a bus is used as an example.

It should be noted that the user equipment provided in this embodiment is merely an example of an user equipment provided in embodiments of the present invention. The user equipment involved in this embodiment of the present invention may have more or less components than the components shown in FIG. 28, may combine two or more components, or may have different component configurations or settings. Each component may be implemented in hardware that includes one or more signal processing circuits and/or application-specific integrated circuits, software, or a combination of hardware and software.

In this embodiment of the present invention, the central processing unit 2802 is configured to execute the following:

determining current channel quality, and selecting the uplink sending parameter according to the current channel quality;

determining, according to a third mapping relationship, a third target sequence corresponding to the selected uplink sending parameter, where the third mapping relationship is used to indicate a correspondence between a sequence and each of an uplink sending parameter and channel quality;

sending the third target sequence and the uplink data to the base station, so that the base station determines, according to the third mapping relationship, a second target uplink sending parameter and second target channel quality that are corresponding to the third target sequence, and the base station demodulates and decodes the uplink data according to the second target uplink sending parameter, determines a downlink sending parameter according to the second target channel quality, and sends downlink data and the determined downlink sending parameter to the user equipment; and demodulating and decoding, according to the downlink sending parameter, the downlink data sent by the base station.

In other embodiments of the present invention, the central processing unit 2802 is further configured to execute the following:

receiving the third mapping relationship sent by the base station.

In other embodiments of the present invention, the central processing unit 2802 is further configured to execute the following:

determining a target uplink sending parameter set according to the selected uplink sending parameter, where the selected uplink sending parameter belongs to the target uplink sending parameter set, the third mapping relationship is used to indicate a correspondence between a sequence and each of channel quality and the uplink sending parameter in an uplink sending parameter set, the uplink sending parameter set is separately allocated by the base station to sub-channels, the sub-channels are determined by the base station by dividing a channel, and the sub-channels are mutually orthogonal;

determining a target sub-channel according to the target uplink sending parameter set, where the target sub-channel is corresponding to the target uplink sending parameter set; and sending the third target sequence and the uplink data to the base station by using the target sub-channel, so that the base station determines the target uplink sending parameter set according to the target sub-channel and determines, from the target uplink sending parameter set according to the third mapping relationship, the second target uplink sending parameter and the second target channel quality that are corresponding to the third target sequence.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data transmission method, comprising:
receiving, by a base station, a first target sequence and uplink data from a user equipment;
determining, by the base station according to a first mapping relationship, a first target uplink sending parameter corresponding to the first target sequence, wherein the first mapping relationship indicates a correspondence between the first target uplink sending parameter and the first target sequence; and
demodulating and decoding, by the base station, the uplink data according to the first target uplink sending parameter;
wherein the method further comprises:
establishing, by the base station, the first mapping relationship, wherein establishing the first mapping relationship comprises:
dividing, by the base station, a channel into multiple sub-channels, wherein the sub-channels are mutually orthogonal;
allocating, by the base station, an uplink sending parameters set to the sub-channels; and
establishing, by the base station, the first mapping relationship according to the uplink sending parameter set.

2. The data transmission method according to claim 1, wherein the first target sequence and the uplink data are received from the user equipment using a target sub-channel; and
wherein determining, according to the first mapping relationship, the first target uplink sending parameter corresponding to the first target sequence comprises:
determining, by the base station, a target uplink sending parameter set according to the target sub-channel, and
determining, from the target uplink sending parameter set according to the first mapping relationship, the first target uplink sending parameter corresponding to the first target sequence.

3. The data transmission method according to claim 1, wherein the method further comprises:
receiving, by the base station, a second target sequence from the user equipment, and determining, according to a second mapping relationship, a first target channel quality corresponding to the second target sequence, wherein the second mapping relationship indicates a correspondence between the first target channel quality and the second target sequence; and
determining, by the base station, a downlink sending parameter according to the first target channel quality, and sending downlink data and the determined downlink sending parameter to the user equipment to facilitate the user equipment demodulating decoding, according to the downlink sending parameter, the downlink data sent by the base station.

4. A data transmission method, comprising:
receiving, by a base station, a third target sequence and uplink data from a user equipment;
determining, by the base station according to a third mapping relationship, a second target uplink sending parameter and a second target channel quality that correspond to the third target sequence, wherein the third mapping relationship indicates a correspondence between the third target sequence and the second target uplink sending parameter and the second target channel quality;
demodulating and decoding, by the base station, the uplink data according to the second target uplink sending parameter; and
determining, by the base station, a downlink sending parameter according to the second target channel quality, and sending downlink data and the determined downlink sending parameter to the user equipment to facilitate the user equipment demodulating and decoding, according to the downlink sending parameter, the downlink data sent by the base station;
wherein the method further comprises:
dividing, by the base station, a channel into multiple sub-channels, wherein the sub-channels are mutually orthogonal;
allocating, by the base station, an uplink sending parameter set to the sub-channels; and
establishing, by the base station, the third mapping relationship according to the uplink sending parameter set.

5. The data transmission method according to claim 4, wherein the third target sequence and the uplink data are received using a target sub-channel; and
wherein determining, according to the third mapping relationship, the second target uplink sending parameter and the second target channel quality that correspond to the third target sequence comprises:
determining, by the base station, a target uplink sending parameter set according to the target sub-channel, and
determining, from the target uplink sending parameter set according to the third mapping relationship, the second target uplink sending parameter and the second target channel quality that correspond to the third target sequence.

6. A data transmission method, comprising:
determining, by a user equipment, a current channel quality; and selecting an uplink sending parameter according to the current channel quality;
determining, by the user equipment according to a first mapping relationship, a first target sequence corresponding to the selected uplink sending parameter, wherein the first mapping relationship indicates a correspondence between the selected uplink sending parameter and the first target sequence; and
sending, by the user equipment, uplink data and the first target sequence to a base station to facilitate the base station determining, according to the first mapping relationship, a first target uplink sending parameter corresponding to the first target sequence and demodulating and decoding the uplink data according to the first target uplink sending parameter;

wherein the uplink sending parameter belongs to a target uplink sending parameter set, wherein the target uplink sending parameter set is allocated by the base station to target sub-channels, the target sub-channels are determined by the base station by dividing a channel, and the target sub-channels are mutually orthogonal.

7. The data transmission method according to claim 6, wherein after determining the current channel quality and selecting the uplink sending parameter according to the current channel quality, the method further comprises:

determining, by the user equipment, the target uplink sending parameter set according to the selected uplink sending parameter; and determining, by the user equipment, a target sub-channel according to the target uplink sending parameter set, wherein the target sub-channel corresponds to the target uplink sending parameter set; and wherein the first target sequence and the uplink data are sent to the base station by using the target sub-channel to facilitate the base station determining the target uplink sending parameter set according to the target sub-channel and determining, from the target uplink sending parameter set according to the first mapping relationship, the first target uplink sending parameter corresponding to the first target sequence.

8. The data transmission method according to claim 6, wherein the method further comprises:

receiving, by the user equipment, a second mapping relationship from the base station, wherein the second mapping relationship indicates a correspondence between the current channel quality and a second target sequence;

determining, by the user equipment according to the second mapping relationship, the second target sequence corresponding to the current channel quality;

sending, by the user equipment, the second target sequence to the base station to facilitate the base station determining, according to the second mapping relationship, a first target channel quality corresponding to the second target sequence, determining a downlink sending parameter according to the first target channel quality, and sending downlink data and the determined downlink sending parameter to the user equipment; and demodulating and decoding, by the user equipment, the downlink data according to the downlink sending parameter.

9. A data transmission method, comprising:

determining, by user equipment, a current channel quality, and selecting an uplink sending parameter according to the current channel quality;

determining, by the user equipment according to a third mapping relationship, a third target sequence corresponding to the selected uplink sending parameter, wherein the third mapping relationship indicates a correspondence between the third target sequence and each of the selected uplink sending parameter and the current channel quality;

sending, by the user equipment, the third target sequence and uplink data to a base station to facilitate the base station determining, according to the third mapping relationship, a second target uplink sending parameter and a second target channel quality that correspond to the third target sequence, demodulating and decoding the uplink data according to the second target uplink sending parameter, determining a downlink sending parameter according to the second target channel quality, and sending downlink data and the determined downlink sending parameter to the user equipment; and demodulating and decoding, by the user equipment according to the downlink sending parameter, the downlink data;

wherein the selected uplink sending parameter belongs to a target uplink sending parameter set, wherein the target uplink sending parameter set is allocated by the base station to target sub-channels, the target sub-channels are determined by the base station by dividing a channel, and the target sub-channels are mutually orthogonal.

10. The data transmission method according to claim 9, wherein:

after determining the current channel quality and selecting the uplink sending parameter according to the current channel quality, the method further comprises:

determining, by the user equipment, the target uplink sending parameter set according to the selected uplink sending parameter; and determining, by the user equipment, a target sub-channel according to the target uplink sending parameter set, wherein the target sub-channel corresponds to the target uplink sending parameter set; and wherein the third target sequence and the uplink data are sent at to the base station by using the target sub-channel to facilitate the base station determining the target uplink sending parameter set according to the target sub-channel and determining, from the target uplink sending parameter set according to the third mapping relationship, the second target uplink sending parameter and the second target channel quality that correspond to the third target sequence.

11. A base station, comprising:

a receiver, configured to receive a first target sequence and uplink data from a user equipment;

a processor, configured to:

determine, according to a first mapping relationship, a first target uplink sending parameter corresponding to the first target sequence, wherein the first mapping relationship indicates a correspondence between the first target uplink sending parameter and the first target sequence; and demodulate and decode the uplink data according to the first target uplink sending parameter;

wherein the processor is further configured to establish the first mapping relationship, wherein establishing the first mapping relationship comprises:

dividing a channel into multiple sub-channels, wherein the sub-channels are mutually orthogonal;

allocating an uplink sending parameter set to the sub-channels; and establishing the first mapping relationship according to the uplink sending parameter set.

12. The base station according to claim 11, wherein the first target sequence and the uplink data are received from the user equipment using a target sub-channel; and wherein determining, according to the first mapping relationship, the first target uplink sending parameter corresponding to the first target sequence comprises:

determining a target uplink sending parameter set according to the target sub-channel, and determining, from the target uplink sending parameter set according to the first mapping relationship, the first target uplink sending parameter corresponding to the first target sequence.

13. The base station according to claim 11, wherein the receiver is further configured to receive a second target sequence from the user equipment;

wherein the processor is further configured to determine, according to a second mapping relationship, a first target channel quality corresponding to the second target sequence, wherein the second mapping relationship indicates a correspondence between the first target channel quality and the second target sequence;

wherein the processor is further configured to determine a downlink sending parameter according to the first target channel quality;

wherein the base station further comprises a transmitter, configured to send downlink data and the determined downlink sending parameter to the user equipment to facilitate the user equipment demodulating and decoding, according to the downlink sending parameter, the downlink data sent by the base station.

14. A base station, comprising:

a receiver, configured to receive a third target sequence and uplink data from a user equipment;

a processor, configured to:

determine, according to a third mapping relationship, a second target uplink sending parameter and a second target channel quality that correspond to the third target sequence, wherein the third mapping relationship indicates a correspondence between the third target sequence and the second target uplink sending parameter and the second target channel quality;

demodulate and decode the uplink data according to the second target uplink sending parameter; and determine a downlink sending parameter according to the second target channel quality; and a transmitter, configured to send downlink data and the determined downlink sending parameter to the user equipment to facilitate the user equipment demodulating and decoding, according to the downlink sending parameter, the downlink data sent by the base station;

wherein the processor is further configured to:

divide a channel into multiple sub-channels, wherein the sub-channels are mutually orthogonal;

allocate an uplink sending parameter set to the sub-channels; and establish the third mapping relationship according to the uplink sending parameter set.

15. The base station according to claim 14, wherein the third target sequence and the uplink data are received using a target sub-channel; and wherein determining, according to the third mapping relationship, the second target uplink sending parameter and the second target channel quality that correspond to the third target sequence comprises:

determining a target uplink sending parameter set according to the target sub-channel, and determining, from the target uplink sending parameter set according to the third mapping relationship, the second target uplink sending parameter and the second target channel quality that correspond to the third target sequence.

16. A user equipment, comprising:

a processor, configured to:

determine a current channel quality and select an uplink sending parameter according to the current channel quality; and determine, according to a first mapping relationship, a first target sequence corresponding to the selected uplink sending parameter, wherein the first mapping relationship indicates a correspondence between the selected uplink sending parameter and the first target sequence; and a transmitter, configured to send uplink data and the first target sequence to a base station to facilitate the base station determining, according to the first mapping relationship, a first target uplink sending parameter corresponding to the first target sequence and demodulating and decoding the uplink data according to the first target uplink sending parameter;

wherein the uplink sending parameter belongs to a target uplink sending parameter set, wherein the target uplink sending parameter set is allocated by the base station to target sub-channels, the target sub-channels are determined by the base station by dividing a channel, and the target sub-channels are mutually orthogonal.

17. The user equipment according to claim 16, wherein the processor is further configured to, after determining the current channel quality and selecting the uplink sending parameter according to the current channel quality:

determine the target uplink sending parameter set according to the selected uplink sending parameter; and determine a target sub-channel according to the target uplink sending parameter set, wherein the target sub-channel corresponds to the target uplink sending parameter set; and wherein the first target sequence and the uplink data are sent to the base station by using the target sub-channel to facilitate the base station determining the target uplink sending parameter set according to the target sub-channel and determining, from the target uplink sending parameter set according to the first mapping relationship, the first target uplink sending parameter corresponding to the first target sequence.

18. The user equipment according to claim 16, wherein the receiver is further configured to receive a second mapping relationship from the base station, wherein the second mapping relationship indicates a correspondence between the current channel quality and a second target sequence;

wherein the processor is further configured to determine, according to the second mapping relationship, the second target sequence corresponding to the current channel quality;

wherein the transmitter is further configured to send the second target sequence to the base station to facilitate the base station determining, according to the second mapping relationship, a first target channel quality corresponding to the second target sequence, determining a downlink sending parameter according to the first target channel quality, and sending downlink data and the determined downlink sending parameter to the user equipment; and wherein the processor is further configured to demodulate and decode the downlink data according to the downlink sending parameter.

19. A user equipment, comprising:
a processor, configured to:
- determine a current channel quality and select an uplink sending parameter according to the current channel quality; and
- determine, according to a third mapping relationship, a third target sequence corresponding to the selected uplink sending parameter, wherein the third mapping relationship indicates a correspondence between the third target sequence and each of the selected uplink sending parameter and the current channel quality; and a transmitter, configured to send the third target sequence and uplink data to a base station to facilitate the base station determining, according to the third mapping relationship, a second target uplink sending parameter and a second target channel quality that correspond to the third target sequence, demodulating and decoding the uplink data according to the second target uplink sending parameter, determining a downlink sending parameter according to the second target channel quality, and sending downlink data and the determined downlink sending parameter to the user equipment;

wherein the processor is further configured to demodulate and decode, according to the downlink sending parameter, the downlink data;

wherein the selected uplink sending parameter belongs to a target uplink sending parameter set, wherein the target uplink sending parameter set is allocated by the base station to target sub-channels, the target sub-channels are determined by the base station by dividing a channel, and the target sub-channels are mutually orthogonal.

20. The user equipment according to claim 19, wherein the processor is further configured to, after determining the current channel quality and selecting the uplink sending parameter according to the current channel quality:
- determine the target uplink sending parameter set according to the selected uplink sending parameter; and
- determine a target sub-channel according to the target uplink sending parameter set, wherein the target sub-channel corresponds to the target uplink sending parameter set; and
- wherein the third target sequence and the uplink data are sent to the base station by using the target sub-channel to facilitate the base station determining the target uplink sending parameter set according to the target sub-channel and determining, from the target uplink sending parameter set according to the third mapping relationship, the second target uplink sending parameter and the second target channel quality that correspond to the third target sequence.

* * * * *

UNITED STATES PATENT AND TRADEMARK OFFICE
CERTIFICATE OF CORRECTION

PATENT NO. : 10,306,666 B2  
APPLICATION NO. : 15/363920  
DATED : May 28, 2019  
INVENTOR(S) : Zhu et al.

Page 1 of 1

It is certified that error appears in the above-identified patent and that said Letters Patent is hereby corrected as shown below:

In the Claims

Claim 1, Column 47, Line 43, "parameters" should read -- parameter --.

Claim 3, Column 48, Line 7, "the user equipment demodulating decoding" should read -- the user equipment demodulating and decoding --.

Claim 9, Column 49, Line 53, "determining, by user equipment," should read -- determining, by a user equipment, --.

Claim 10, Column 50, Line 31, "sent at to the base station" should read -- sent to the base station --.

Signed and Sealed this  
Eighteenth Day of February, 2020

Andrei Iancu  
*Director of the United States Patent and Trademark Office*